US011153598B2

(12) United States Patent
Li et al.

(10) Patent No.: US 11,153,598 B2
(45) Date of Patent: Oct. 19, 2021

(54) METHOD AND APPARATUS FOR VIDEO CODING USING A SUBBLOCK-BASED AFFINE MOTION MODEL

(71) Applicant: TENCENT AMERICA LLC, Palo Alto, CA (US)

(72) Inventors: Guichun Li, Milpitas, CA (US); Xiang Li, Saratoga, CA (US); Xiaozhong Xu, State College, PA (US); Shan Liu, San Jose, CA (US)

(73) Assignee: TENCENT AMERICA LLC, Palo Alto, CA (US)

(*) Notice: Subject to any disclaimer, the term of this patent is extended or adjusted under 35 U.S.C. 154(b) by 0 days.

(21) Appl. No.: 16/889,724

(22) Filed: Jun. 1, 2020

(65) Prior Publication Data

US 2020/0389663 A1      Dec. 10, 2020

Related U.S. Application Data

(60) Provisional application No. 62/868,488, filed on Jun. 28, 2019, provisional application No. 62/857,166, filed on Jun. 4, 2019.

(51) Int. Cl.
| | |
|---|---|
| *H04N 11/02* | (2006.01) |
| *H04N 19/52* | (2014.01) |
| *H04N 19/184* | (2014.01) |
| *H04N 19/176* | (2014.01) |

(52) U.S. Cl.
CPC ........... *H04N 19/52* (2014.11); *H04N 19/176* (2014.11); *H04N 19/184* (2014.11)

(58) Field of Classification Search
CPC ..................................................... H04N 19/52
USPC ........................................ 375/240.01–240.29
See application file for complete search history.

(56) References Cited

U.S. PATENT DOCUMENTS

2019/0273943 A1\*   9/2019   Zhao .................... H04N 19/176

OTHER PUBLICATIONS

Benjamin Bross et al., Versatile Video Coding (Draft 4), Document: JVET-M1001-v7, Jan. 9-18, 2019, 299 pages.

(Continued)

*Primary Examiner* — Leron Beck
(74) *Attorney, Agent, or Firm* — Oblon, McClelland, Maier & Neustadt, L.L.P.

(57) ABSTRACT

Aspects of the disclosure provide methods and an apparatus for video coding. The apparatus includes processing circuitry that decodes coding information of a current block (CB) from a coded video bitstream. The coding information indicates that the CB is coded with a subblock-based affine motion model including affine parameters that are based on multiple control point motion vectors (MVs) for the CB. The processing circuitry determines, based on the coding information, whether to select a subblock characteristic for generating a prediction for a sample in an affine subblock of the CB based on a corresponding subblock MV. In response to selecting the subblock characteristic, the processing circuitry determines the subblock characteristic based on at least one of the affine parameters. The subblock characteristic indicates one of: (i) a subblock size used for generating the prediction for the sample and (ii) an interpolation filter type for the affine subblock.

20 Claims, 15 Drawing Sheets

(56) References Cited

OTHER PUBLICATIONS

Jiancong (Daniel) Luo et al., CE2-related: Prediction refinement with optical flow for affine mode, Document: JVET-N0236-r5, Mar. 19-27, 2019, 8 pages.

Series H: Audiovisual and Multimedia Systems Infrastructure of audiovisual services—Coding of moving video; ITU-T, H.265, Dec. 2016, 664 pages.

* cited by examiner

METHOD AND APPARATUS FOR VIDEO CODING USING A SUBBLOCK-BASED AFFINE MOTION MODEL

INCORPORATION BY REFERENCE

This present disclosure claims the benefit of priority to U.S. Provisional Application No. 62/857,166, "Conditional Affine Motion Compensation and Refinement" filed on Jun. 4, 2019, and U.S. Provisional Application No. 62/868,488, "Inter Prediction Refinement Calculation and Conditional Affine Model Compensation" filed on Jun. 28, 2019, which are incorporated by reference herein in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes processing circuitry. The processing circuitry can be configured to decode coding information of a current block (CB) from a coded video bitstream. The coding information can indicate that the CB is coded with a subblock-based affine motion model. The subblock-based affine motion model can include affine parameters that are based on multiple control point (CP) motion vectors (MVs) (CPMVs) for the CB. The CB can include an affine subblock having a subblock MV. The processing circuitry can determine, based on the coding information, whether to select a subblock characteristic for generating a prediction for a sample in the affine subblock based on the subblock MV. In response to selecting the subblock characteristic, the processing circuitry can determine the subblock characteristic based on at least one of the affine parameters. The subblock characteristic can indicate one of: (i) a subblock size used for generating the prediction for the sample and (ii) an interpolation filter type for the affine subblock. The processing circuitry can reconstruct the sample in the affine subblock based on the determined subblock characteristic.

In an embodiment, when the subblock-based affine motion model is based on a 4-parameter affine motion model, the CB includes a top left CP having a first CPMV and a top right CP having a second CPMV. The affine parameters include a first affine parameter and a second affine parameter. The first affine parameter can indicate a ratio of an x component of a first MV difference between the second CPMV and the first CPMV over a width of the CB. The second affine parameter can indicate a ratio of a y component of the first MV difference over the width of the CB. When the subblock-based affine motion model is based on a 6-parameter affine motion model, the CB includes the top left CP having the first CPMV, the top right CP having the second CPMV, and a bottom left CP having a third CPMV. The affine parameters can include the first affine parameter, the second affine parameter, a third affine parameter, and a fourth affine parameter. The third affine parameter can indicate a ratio of an x component of a second MV difference between the third CPMV and the first CPMV over a height of the CB. The fourth affine parameter can indicate a ratio of a y component of the second MV difference over the height of the CB.

In an embodiment, the processing circuitry can determine the subblock characteristic based on the at least one of the affine parameters and one of: (i) a threshold and (ii) a pre-defined range. The subblock size can include an affine subblock size of the affine subblock. The interpolation filter type can include a first interpolation filter having a first length or a second interpolation filter having a second length where the first length is less than the second length.

In an embodiment, the at least one of the affine parameters includes a plurality of the affine parameters. The processing circuitry can determine whether absolute values of the plurality of the affine parameters satisfy a pre-defined condition that is one of: (i) a maximum of the absolute values is larger than the threshold, (ii) the maximum of the absolute values is larger than or equal to the threshold, (iii) a minimum of the absolute values is larger than the threshold, (iv) the minimum of the absolute values is larger than or equal to the threshold, and (v) the absolute values are outside the pre-defined range. In response to the absolute values satisfying the pre-defined condition, the processing circuitry can determine the subblock characteristic to indicate one of: the affine subblock size being a first size and the interpolation filter type being the first interpolation filter. In response to the absolute values not satisfying the pre-defined condition, the processing circuitry can determine the subblock characteristic to indicate one of: the affine subblock size being a second size and the interpolation filter type being the second interpolation filter, the second size being larger than the first size.

In an embodiment, the CB includes a gradient subblock used for gradient calculations in a prediction refinement with optical flow (PROF) for the CB. The subblock size is a size of the gradient subblock. The gradient calculations are (i) block-based gradient calculations with the subblock size being equal to a block size of the CB or (ii) subblock-based gradient calculations with the subblock size being less than the block size.

In an embodiment, the at least one of the affine parameters includes a plurality of the affine parameters. The processing circuitry can determine based on one of: (i) a maximum or a minimum of absolute values of the plurality of the affine parameters and a threshold and (ii) the absolute values and a pre-defined range, whether the gradient calculations are block-based or subblock-based.

In an embodiment, the processing circuitry can pad, for the block-based gradient calculations, a neighboring sample of the CB by one of: (i) interpolating using a corresponding subblock MV of a subblock that includes the neighboring sample, (ii) copying from a nearest integer sample position in a reference picture for the CB, and (iii) copying from a prediction of a closest sample in the CB, the neighboring sample of the CB being used for the block-based gradient calculations.

In an embodiment, the subblock size is one of: a width of the affine subblock, a height of the affine subblock, a width of an affine PROF subblock used in a PROF for the CB, a height of the affine PROF subblock, a width of a gradient subblock used in gradient calculations in the PROF, and a height of the gradient subblock. The interpolation filter type is one of: (i) a first interpolation filter having a first length for horizontal interpolation, (ii) a second interpolation filter having a second length for the horizontal interpolation, (iii) a first interpolation filter having the first length for vertical interpolation, and (iv) a second interpolation filter having the second length for the vertical interpolation, the second length being larger than the first length.

In an embodiment, the processing circuitry can determine another subblock characteristic based on at least another one of the affine parameters. The at least another one of the affine parameters can be different from or identical to the at least one of the affine parameters, and the other subblock characteristic can be different from the subblock characteristic.

In an embodiment, the at least one of the affine parameters includes a plurality of the affine parameters. The processing circuitry can determine the subblock characteristic based on one of (i) a threshold and a minimum value, a maximum value, a minimum absolute value, a maximum absolute value, or a mean value of the plurality of the affine parameters and (ii) a pre-defined range and a value range of the plurality of the affine parameters.

In an embodiment, the at least one of the affine parameters includes a plurality of the affine parameters. The subblock characteristic is determined based on a maximum absolute value of the plurality of the affine parameters and a threshold. In response to the maximum absolute value being one of larger than the threshold and larger than or equal to the threshold, the processing circuitry can determine the subblock characteristic to indicate one of: (i) the subblock size being a first size, (ii) the interpolation filter type being the first interpolation filter for the horizontal interpolation, and (iii) the interpolation filter type being the first interpolation filter for the vertical interpolation. In response to the maximum absolute value not being the one of larger than the threshold and larger than or equal to the threshold, the processing circuitry can determine the subblock characteristic to indicate one of: (i) the subblock size being a second size, (ii) the interpolation filter type being the second interpolation filter for the horizontal interpolation, and (iii) the interpolation filter type being the second interpolation filter for the vertical interpolation, the second size being larger than the first size.

Aspects of the disclosure also provide a non-transitory computer-readable medium storing instructions which when executed by a computer for video decoding cause the computer to perform any of the methods for video decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
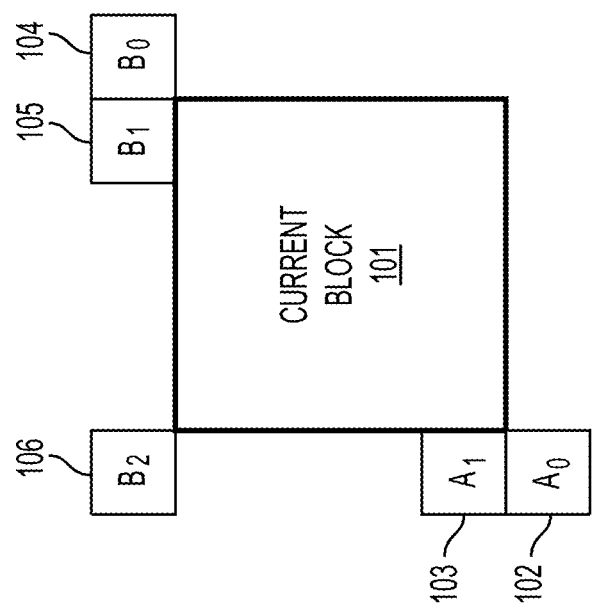
FIG. 1 is a schematic illustration of a current block and its surrounding spatial merge candidates in one example.
Figure 2:
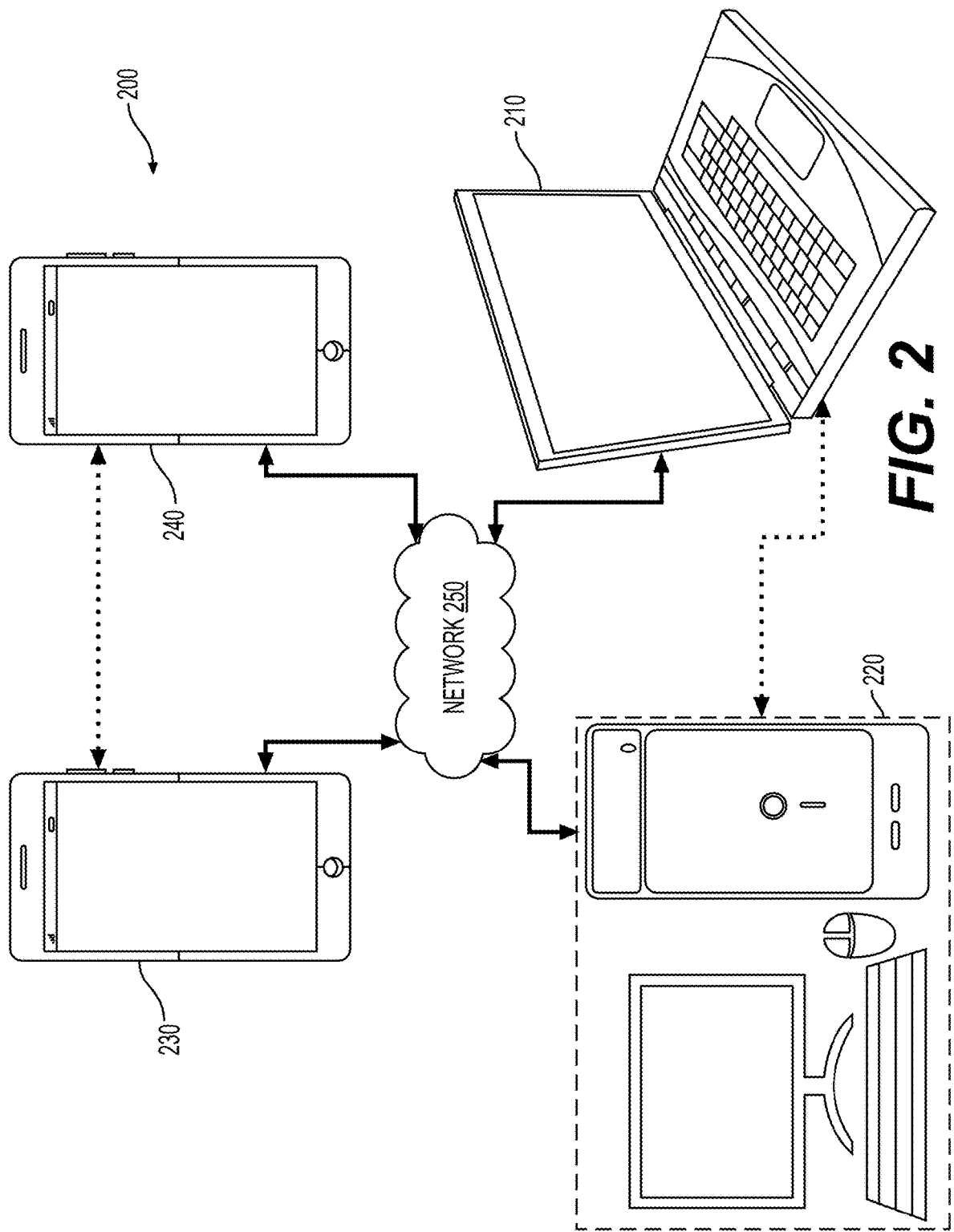
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
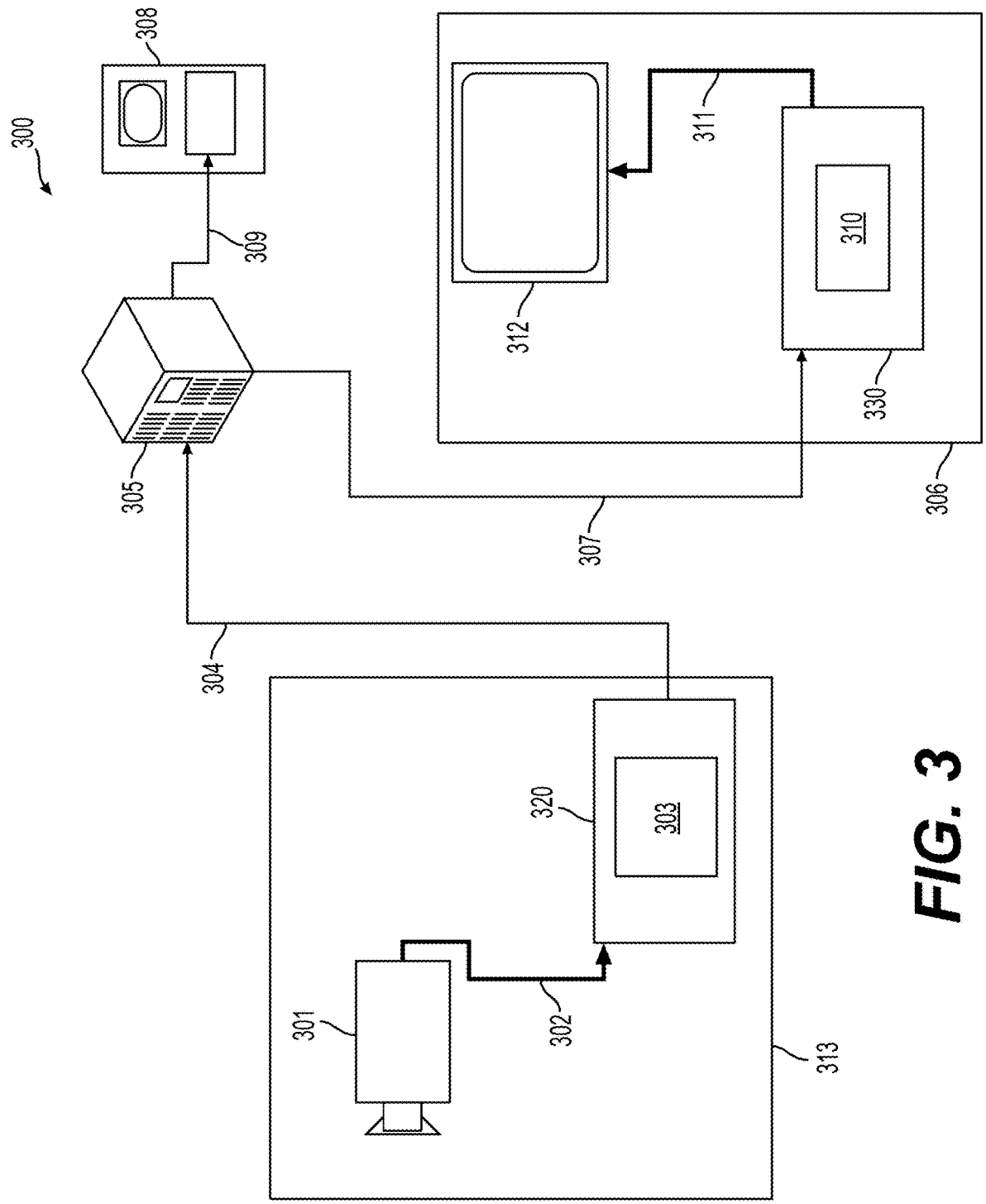
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308)

in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
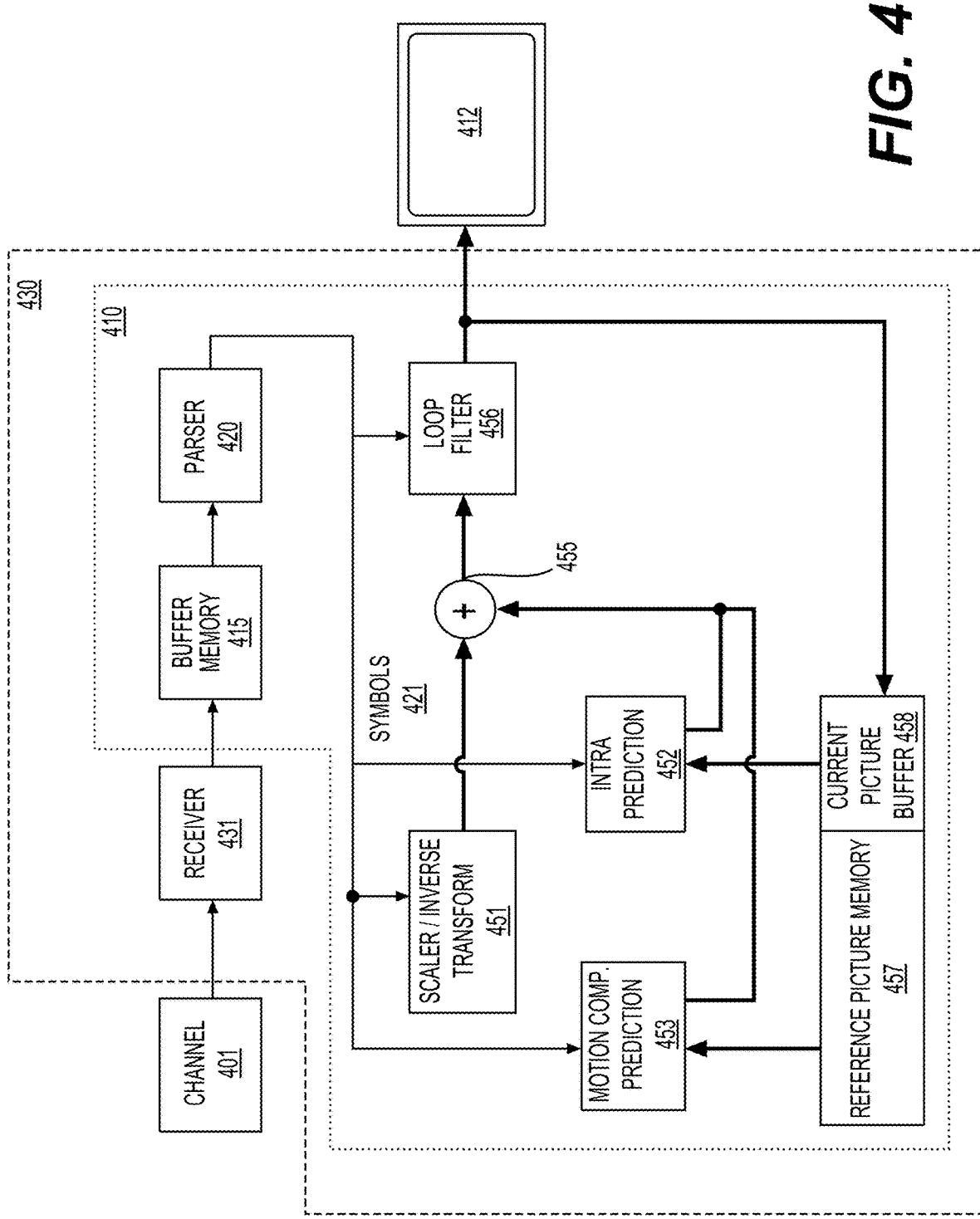
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
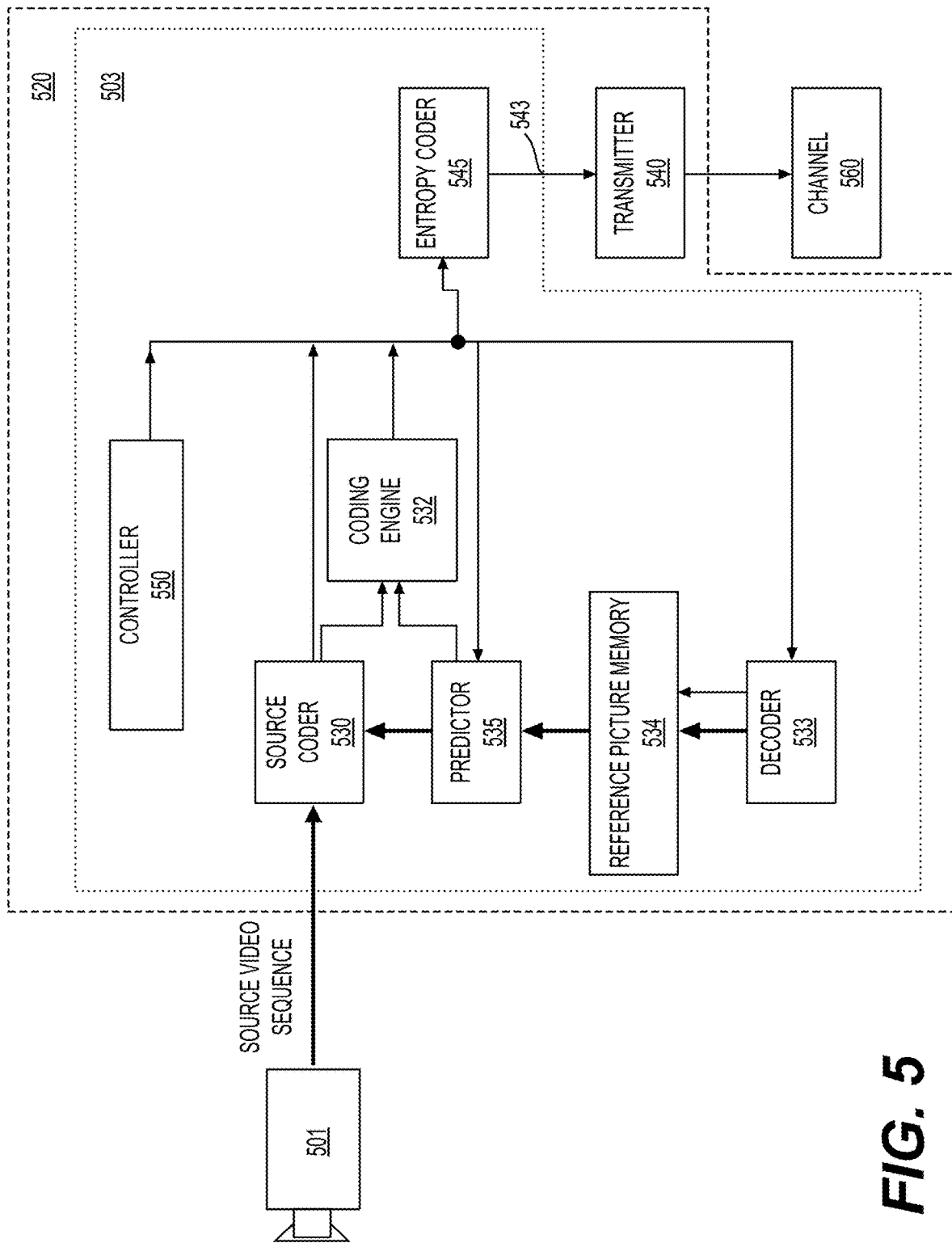
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously coded picture from the video sequence that were designated as "reference pictures." In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
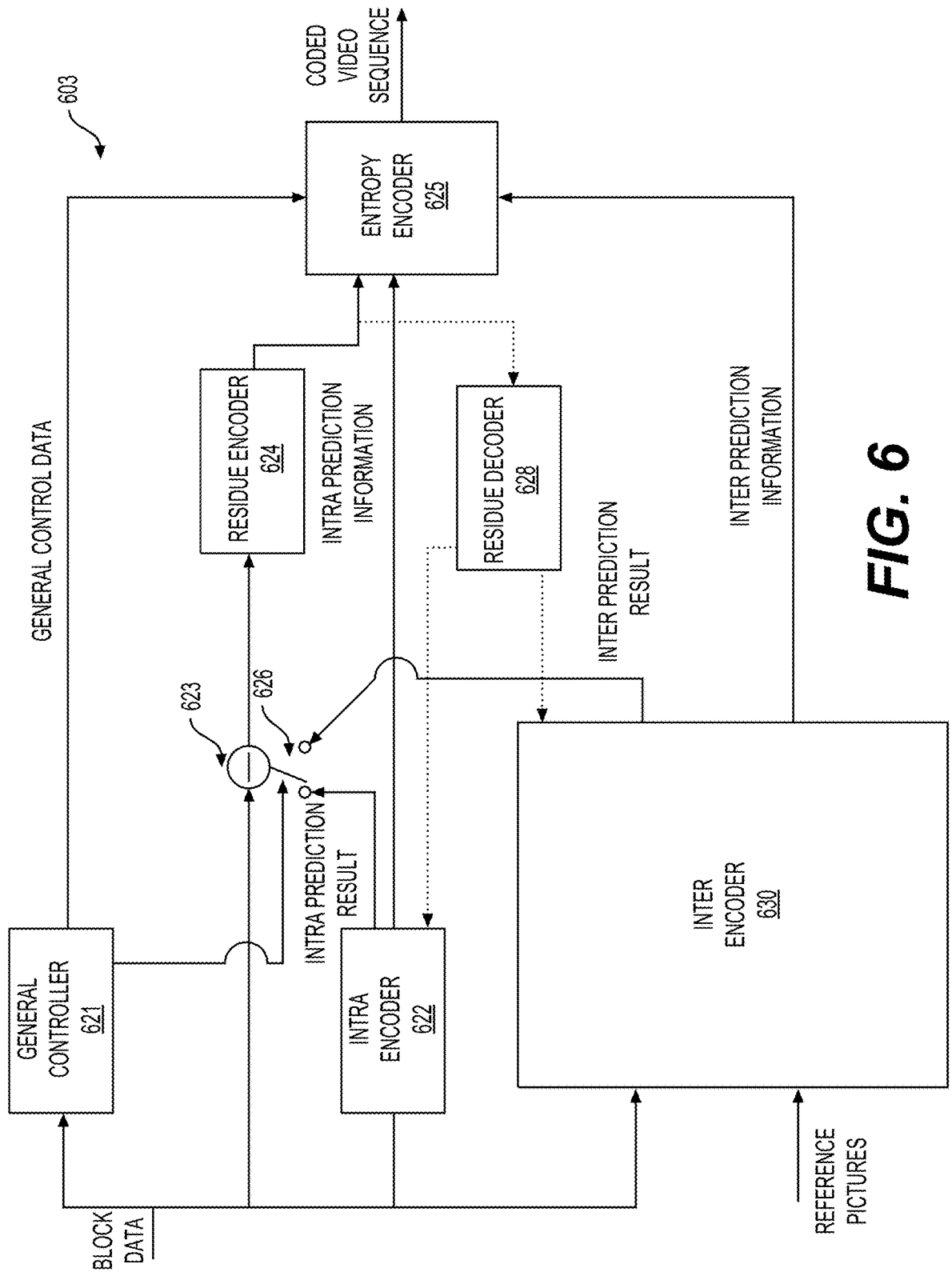
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
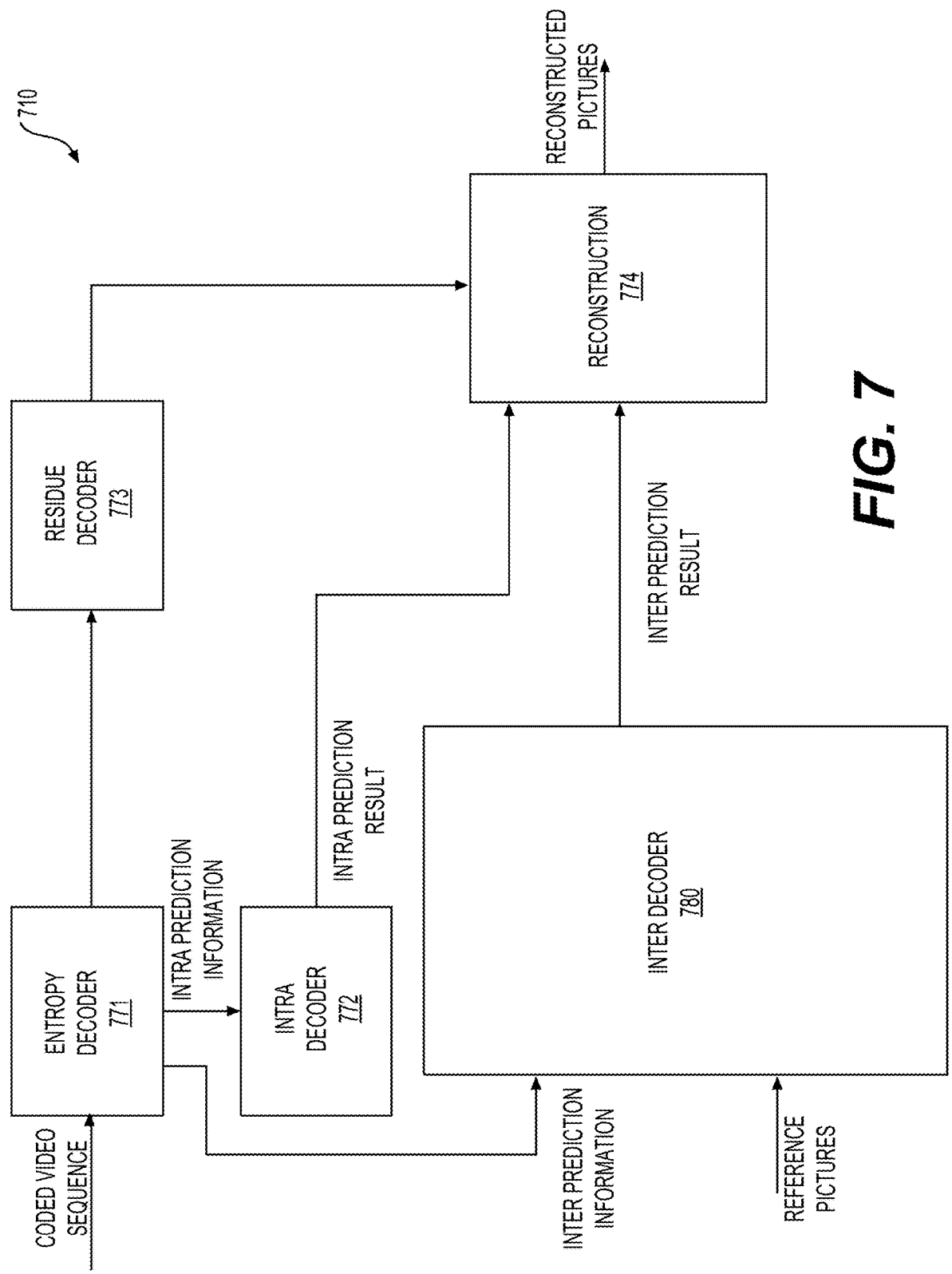
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

Aspects of the disclosure are related to inter-prediction, for example, affine motion compensation and refinement.

In various embodiments, for an inter-predicted CU, motion parameters including motion vectors, reference picture indices, reference picture list usage index, and/or other additional information can be used for inter-predicted sample generation. Inter prediction can include uni-prediction, bi-prediction, and/or the like. In uni-prediction, a reference picture list (e.g., a first reference picture list or a list 0 (L0), a second reference picture list or a list 1 (L1)) can be used. In bi-prediction, both L0 and L1 can be used. The reference picture list usage index can indicate that the reference picture list(s) include L0, L1, or L0 and L1.

The motion parameters can be signaled in an explicit or implicit manner. When a CU is coded with a skip mode, the CU can be associated with one PU and can have no significant residual coefficients (e.g., the residual coefficients are zero), no coded motion vector difference (MVD), or no reference picture index.

A merge mode can be used in which motion parameters for a current CU can be obtained from neighboring CUs, including spatial and temporal merge candidates, and optionally other merge candidates. The merge mode can be applied to an inter-predicted CU, and may be used for a skip mode. Alternatively, motion parameters can be explicit transmitted or signaled. For example, motion vectors, a corresponding reference picture index for each reference picture list, a reference picture list usage flag, and other information can be signaled explicitly per each CU.

In some embodiments, one or more of the following inter prediction coding tools are used: (1) extended merge prediction, (2) merge mode with motion vector difference (MMVD), (3) advanced motion vector prediction (AMVP) mode with symmetric MVD signaling, (4) affine motion compensated prediction, (5) subblock-based temporal motion vector prediction (SbTMVP), (6) adaptive motion vector resolution (AMVR), (7) bi-prediction with weighted averaging (BWA), (8) bi-directional optical flow (BDOF), (9) decoder side motion vector refinement (DMVR), (10) triangle partition prediction, and (11) combined inter and intra prediction (CIIP).

In some examples, a translation motion model is applied for motion compensation prediction (MCP). A block-based affine motion compensation (also referred to as affine motion compensated prediction, affine motion compensation method, affine motion prediction, affine motion model, affine transform motion compensation prediction) can be applied, for example, to model various types of motions, such as zoom in/out, rotation, perspective motions, and other irregular motions (e.g., motions that are different from the translation motion).

Figure 8B:
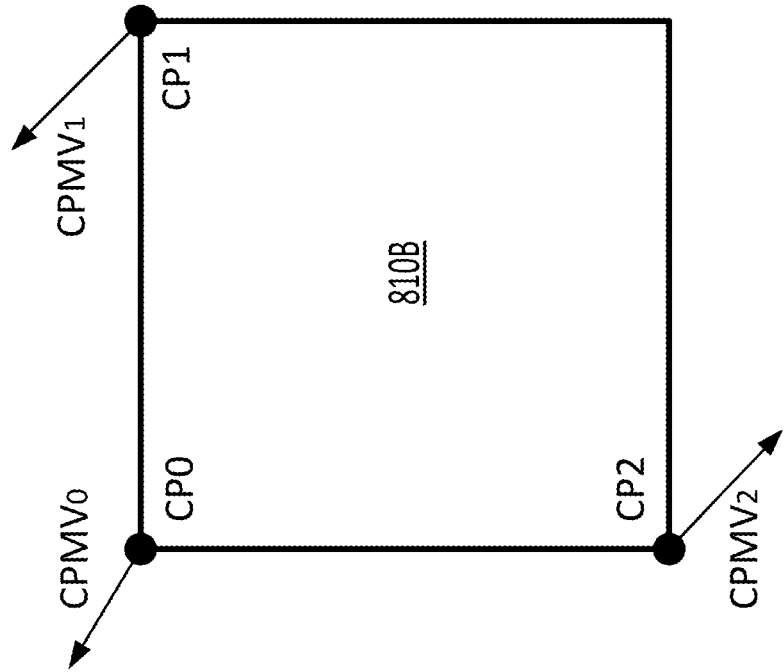
FIG. 8B shows an affine motion model of a block (810B) in accordance with an embodiment of the disclosure.
Figure 8A:
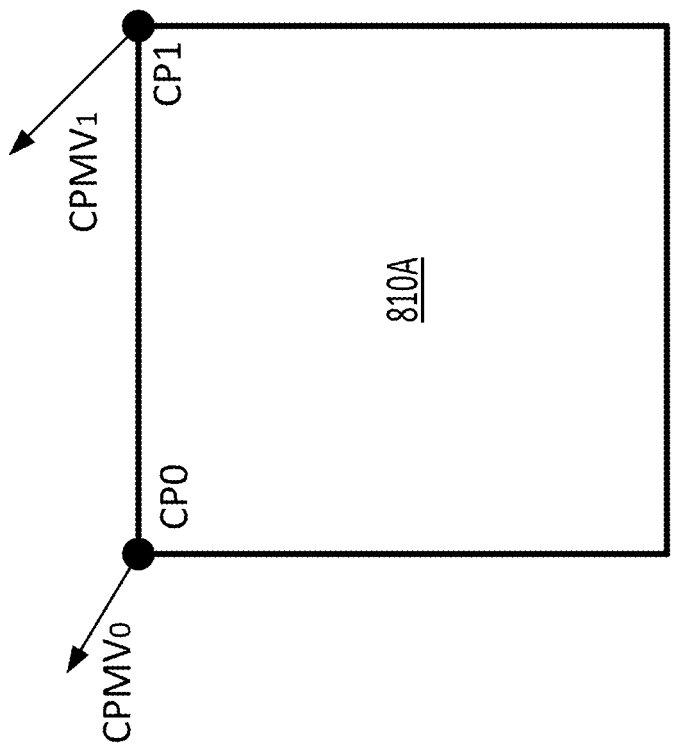
FIG. 8A shows an affine motion model of a block (810A) in accordance with an embodiment of the disclosure.

In FIG. 8A, an affine motion field of a block (810A) is described by motion information of two control points (CPs), CP0 and CP1, when a 4-parameter affine model (or a 4-parameter affine motion model) is used. The motion information can include two MVs or control point MVs (CPMVs), CPMV0 and CPMV1, of CP0 and CP1, respectively. In FIG. 8B, an affine motion field of a block (810B) is described by motion information of three CPs, CP0-CP2, when a 6-parameter affine model (or a 6-parameter affine motion model) is used. The motion information can include three MVs or CPMVs, CPMV0-CPMV2, of CP0-CP2, respectively.

For the 4-parameter affine motion model, a motion vector at a sample location (x, y) in the block (810A) can be derived as:

$$\begin{cases} mv_x = \dfrac{mv_{1x} - mv_{0x}}{W}x - \dfrac{mv_{1y} - mv_{0y}}{W}y + mv_{0x} \\ mv_y = \dfrac{mv_{1y} - mv_{0y}}{W}x + \dfrac{mv_{1x} - mv_{0x}}{W}y + mv_{0y} \end{cases} \quad (\text{Eq. 1})$$

where ($mv_{0x}$, $mv_{0y}$) is a MV (CPMV0) of a top-left CP (CP0) and ($mv_{1x}$, $mv_{1y}$) is a MV (CPMV1) of a top-right CP (CP1). The coordinate (x, y) is with respect to a top-left sample of the block (810A) and W denotes a width of the block (810A).

For the 6-parameter affine motion model, a motion vector at a sample location (x, y) in the block (810B) can be derived as:

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \quad (\text{Eq. 2})$$

where ($mv_{0x}$, $mv_{0y}$) is a MV (CPMV0) of a top-left corner CP (CP0), ($mv_{1x}$, $mv_{1y}$) is a MV (CPMV1) of a top-right corner CP (CP1), and ($mv_{2x}$, $mv_{2y}$) is a MV (CPMV2) of a bottom-left corner CP (CP2). The coordinate (x, y) is with respect to a top-left sample of the block (810B), W denotes a width of the block (810B), and H denotes a height of the block (810B).

Figure 9:
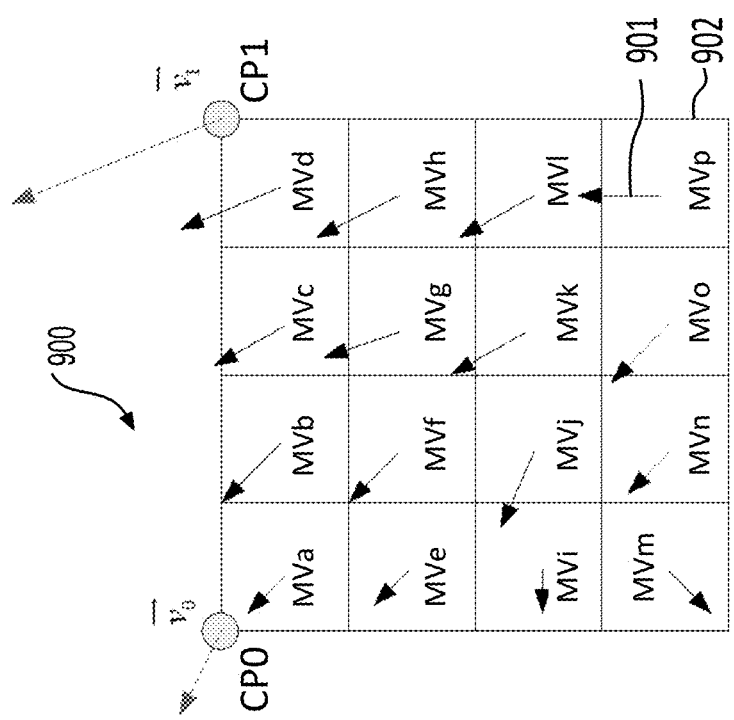
FIG. 9 shows an example of subblock-based affine motion compensation in accordance with an embodiment of the disclosure.

In order to simplify the motion compensation prediction, a subblock-based affine motion compensation (also referred to as a subblock-based affine motion model) is applied in some embodiments, as shown in FIG. 9. In the subblock-based affine motion compensation, a current block (e.g., a luma block) (900) can be partitioned into a plurality of subblocks (also referred to as affine subblocks) (902). MVs of respective samples in each of the plurality of subblocks (902) can be represented using a MV (also referred to as a subblock MV) (901). In an example, a subblock MV (901) of the subblock (902) is a MV of a center sample of the subblock (902). Thus, the subblock MV (901) can be calculated using the 4-parameter affine motion model (e.g., Eq. (1)), the 6-parameter affine motion model (e.g., Eq. (2)), or the like. Referring to FIG. 9, the current block (900) is partitioned to 16 subblocks (902) having 16 subblock MVs (e.g., MVa-MVp) (901).

Referring to FIG. 9, the 4-parameter affine motion model is used as an example. $\vec{v_0}$ and $\vec{v_1}$ are CPMVs for a top-left CP (CP0) and a top-right CP (CP1), respectively. To derive the subblock MV (901) of the subblock (902), the MV of the center sample of the subblock (902) can be calculated according to Eq. (1), and rounded to a 1/16 fraction accuracy (e.g., a precision for the subblock MV is 1/16 of a sample or a pixel). Motion compensation interpolation filters can be applied to generate a prediction of each subblock (902) with the derived MV (901).

A subblock size of chroma-components can be set to be 4×4. A subblock MV of a 4×4 chroma subblock can be calculated as an average of subblock MVs of four corresponding 4×4 luma subblocks.

Similar to translational motion inter prediction, two affine motion inter prediction modes, affine merge mode (or affine merge prediction, an AF_MERGE mode) and affine AMVP mode (or affine AMVP prediction), are employed in some embodiments.

In some embodiments, an affine merge mode (e.g., an AF_MERGE mode) can be applied for CUs with both a width and a height larger than or equal to 8. In the affine merge mode, CPMVs of a current CU can be generated based on motion information of spatial neighboring CUs of the current CU. Up to five CPMV predictor (CPMVP) candidates can be included in a candidate list (e.g., an affine merge candidate list) and an index can be signaled to indicate the candidate to be used for the current CU. The following three types of CPMVP candidates can be used to form an affine merge candidate list: (a) inherited affine merge candidates that are extrapolated from CPMVs of the neighboring CUs (e.g., the spatial neighboring CUs); (b) constructed affine merge candidates that are derived using translational MVs of the neighboring CUs (e.g., the spatial neighboring CUs and/or a temporal neighboring CU); and/or (c) zero MVs.

Figures 10A, 10B:
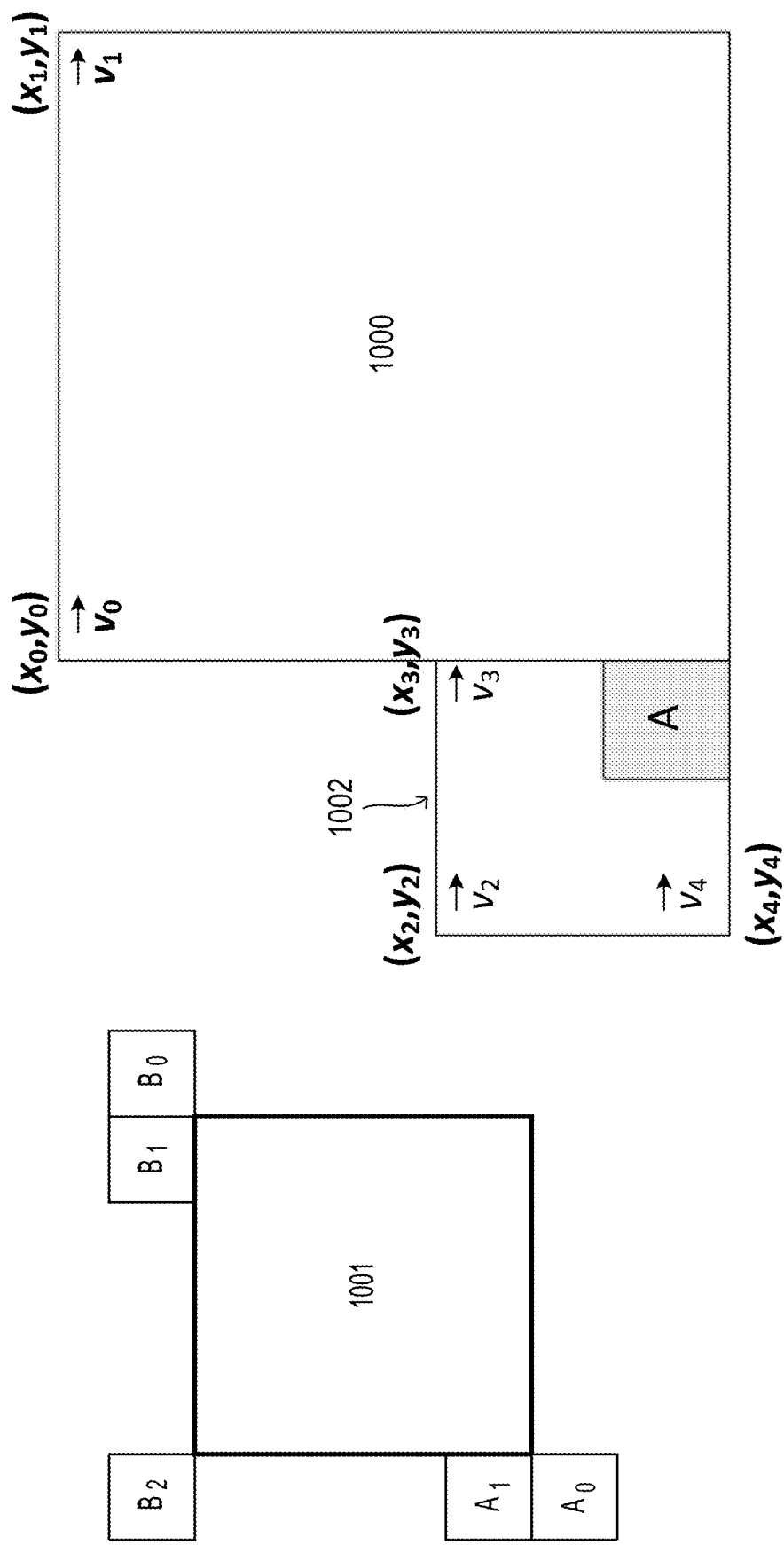
FIG. 10A shows an example of candidate CUs for a CU (1001) in accordance with an embodiment of the disclosure.
FIG. 10B shows an example of control point motion vector inheritance in accordance with an embodiment of the disclosure.

In an embodiment, such as in VTM3, the candidate list (e.g., the affine merge candidate list) includes up to two inherited affine merge candidates that can be derived from affine motion models of the neighboring CUs (or blocks). For example, a first inherited affine merge candidate can be derived from left neighboring CUs and a second inherited affine merge candidate can be derived from above neighboring CUs. Exemplary candidate CUs (or blocks) for a CU (1001) are shown in FIG. 10A. In order to obtain the first inherited affine merge candidate (or a left predictor), a scan order of A0->A1 can be applied. In order to obtain the second inherited affine merge candidate (or an above predictor), a scan order can be B0->B1->B2. In an example, only a first inherited candidate from each side (e.g., left side and/or above side) is selected. In addition, no pruning check is performed between two inherited candidates. When a neighboring affine CU is identified, CPMVs of the neighboring affine CU can be used to derive a CPMVP candidate in the affine merge candidate list of the current CU. As shown in FIG. 10B, if a neighboring left bottom block A is coded in an affine motion mode, MVs v2, v3, and v4 of a top left corner, a top right corner, and a left bottom corner of a CU (1002) that includes the block A can be obtained. When the block A is coded with the 4-parameter affine motion model, two CPMVs of the current CU (1000) can be calculated according to v2 and v3. When the block A is coded with the 6-parameter affine motion model, three CPMVs of the current CU (1000) can be calculated according to v2, v3, and v4.

A constructed affine merge candidate for a CU can refer to a candidate that is constructed by combining neighboring translational motion information of each CP of the CU. The motion information for the CPs can be derived from spatial neighbors and a temporal neighbor of a current block (1100) shown in FIG. 11. $CPMV_k$ (k=1, 2, 3, 4) can represent a k-th CP of the current block (1100). For the $CPMV_1$, blocks B2, B3, and A2 can be checked. For example, a scan order is B2->B3->A2 and a MV of the first available block can be used as the $CPMV_1$. For the $CPMV_2$, blocks B1 and B0 can be checked, for example using a scan order of B1->B0. For the $CPMV_3$, blocks A1 and A0 can be checked, for example using a scan order of A1->A0. When a temporal motion vector predictor (TMVP) (indicated by T in FIG. 11) is available, the TMVP can be applied as the $CPMV_4$.

After MVs of four CPs are obtained, affine merge candidates can be constructed based on the motion information of the four control points. The following combinations of CPMVs can be used to construct the affine merge candidates sequentially:
$\{CPMV_1, CPMV_2, CPMV_3\}$, $\{CPMV_1, CPMV_2, CPMV_4\}$, $\{CPMV_1, CPMV_3, CPMV_4\}$, $\{CPMV_2, CPMV_3, CPMV_4\}$, $\{CPMV_1, CPMV_2\}$, and $\{CPMV_1, CPMV_3\}$.

A combination of 3 CPMVs can construct a 6-parameter affine merge candidate and a combination of 2 CPMVs can construct a 4-parameter affine merge candidate. To avoid a motion scaling process, if reference indices of control points are different, the corresponding combination of CPMVs can be discarded.

After inherited affine merge candidates and constructed affine merge candidates are checked, if the affine merge candidate list is not full, zero MVs can be inserted to the end of the affine merge candidate list.

In some embodiments, an affine AMVP mode can be applied for CUs with both a width and a height larger than or equal to 16. An affine flag in a CU level can be signaled in a bitstream to indicate whether the affine AMVP mode is used and then another flag can be signaled to indicate whether a 4-parameter affine motion model or a 6-parameter affine motion model is used. In the affine AMVP mode, a difference of CPMVs of a current CU and corresponding CPMV predictors (CPMVP) can be signaled in the bitstream. An affine AMVP candidate list size can be 2, and can be generated by using the following four types of CPMV candidates, for example, in an order of (a)->(b)->(c)->(d):
(a) Inherited affine AMVP candidates that are extrapolated from the CPMVs of the neighbor CUs; (b) Constructed affine AMVP candidates that are derived using the translational MVs of the neighbor CUs; (c) Translational MVs from neighboring CUs; and (d) Zero MVs.

The checking order (or scan order) of the inherited affine AMVP candidates is similar or identical to the checking order of the inherited affine merge candidates in an example. In an example, a difference between the inherited affine AMVP candidates and the inherited affine merge candidates is that, for the inherited affine AMVP candidates, only the affine CU that has the same reference picture as in the current block is considered. No pruning process is applied when inserting an inherited affine MV predictor (or inherited affine AMVP candidate) into the affine AMVP candidate list.

Figure 11:
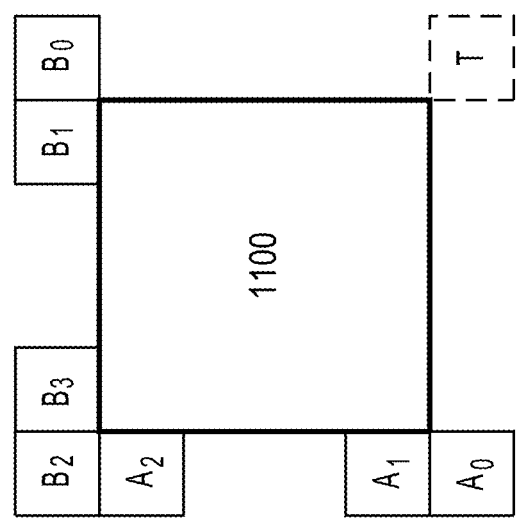
FIG. 11 shows an example of candidate positions for constructing an affine merge candidate in accordance with an embodiment of the disclosure.

A constructed AMVP candidate can be derived from specified spatial neighbors shown in FIG. 11. A same checking order as used in constructing affine merge candidate(s) can be used. In addition, a reference picture index of a neighboring block can also be checked. The first block in the checking order that is inter coded and has the same reference picture as in the current CU can be used. When the current CU is coded with a 4-parameter affine motion model, and CPMV1 and CPMV2 are both available, the available CPMVs (e.g., CPMV1 and CPMV2) can be added as one candidate in the affine AMVP candidate list. When the current CU is coded with a 6-parameter affine motion mode, and all three CPMVs (e.g., CPMV1, CPMV2, and CPMV3) are available, the available CPMVs can be added as one candidate in the affine AMVP candidate list. Otherwise, a constructed AMVP candidate can be set as unavailable.

If the affine AMVP candidate list size is less than 2 after inherited affine AMVP candidate(s) and constructed AMVP candidate(s) are checked, translational MVs from neighboring CU(s) of the current block (1100) can be added to predict all control point MVs of the current block (1100), when available. Finally, zero MVs can be used to fill the affine AMVP candidate list if the affine AMVP candidate list is still not full.

Embodiments of the present disclosure can be applied to affine subblock motion compensation with an interpolation filter (e.g., a 6-tap or 8-tap interpolation filter). In an example, inter prediction on 4×4 luma blocks is disabled except for affine subblock predictions. In an example, for luma blocks with a size of 4×8 or 8×4, only inter uni-prediction is allowed.

In an example, for affine subblock motion compensation for a luma sample size of 4×4, a 6-tap interpolation filter is used, as shown in Table 1. For luma motion compensations that are not based on an affine motion model, an 8-tap interpolation filter can be used, as shown in Table 2.

TABLE 1

The 6-tap interpolation filter

| MV | Tap filter | | | | | |
|---|---|---|---|---|---|---|
| 0 | 0 | 0 | 64 | 0 | 0 | 0 |
| 1/16 | 1 | −3 | 63 | 4 | −2 | 1 |
| 1/8 | 1 | −5 | 62 | 8 | −3 | 1 |
| 3/16 | 2 | −8 | 60 | 13 | −4 | 1 |
| 1/4 | 3 | −10 | 58 | 17 | −5 | 1 |
| 5/16 | 3 | −11 | 52 | 26 | −8 | 2 |
| 3/8 | 2 | −9 | 47 | 31 | −10 | 3 |
| 7/16 | 3 | −11 | 45 | 34 | −10 | 3 |
| 1/2 | 3 | −11 | 40 | 40 | −11 | 3 |
| 9/16 | 3 | −10 | 34 | 45 | −11 | 3 |
| 5/8 | 3 | −10 | 31 | 47 | −9 | 2 |
| 11/16 | 2 | −8 | 26 | 52 | −11 | 3 |
| 6/8 | 1 | −5 | 17 | 58 | −10 | 3 |
| 13/16 | 1 | −4 | 13 | 60 | −8 | 2 |

TABLE 1-continued

The 6-tap interpolation filter

| MV | Tap filter | | | | | |
|---|---|---|---|---|---|---|
| 0 | 0 | 0 | 64 | 0 | 0 | 0 |
| 7/8 | 1 | −3 | 8 | 62 | −5 | 1 |
| 15/16 | 1 | −2 | 4 | 63 | −3 | 1 |

TABLE 2

The 8-tap interpolation filter

| MV | Tap filter | | | | | | | |
|---|---|---|---|---|---|---|---|---|
| 0 | 0 | 0 | 0 | 64 | 0 | 0 | 0 | 0 |
| 1/16 | 0 | 1 | −3 | 63 | 4 | −2 | 1 | 0 |
| 1/8 | −1 | 2 | −5 | 62 | 8 | −3 | 1 | 0 |
| 3/16 | −1 | 3 | −8 | 60 | 13 | −4 | 1 | 0 |
| 1/4 | −1 | 4 | −10 | 58 | 17 | −5 | 1 | 0 |
| 5/16 | −1 | 4 | −11 | 52 | 26 | −8 | 3 | −1 |
| 3/8 | −1 | 3 | −9 | 47 | 31 | −10 | 4 | −1 |
| 7/16 | −1 | 4 | −11 | 45 | 34 | −10 | 4 | −1 |
| 1/2 | −1 | 4 | −11 | 40 | 40 | −11 | 4 | −1 |
| 9/16 | −1 | 4 | −10 | 34 | 45 | −11 | 4 | −1 |
| 5/8 | −1 | 4 | −10 | 31 | 47 | −9 | 3 | −1 |
| 11/16 | −1 | 3 | −8 | 26 | 52 | −11 | 4 | −1 |
| 6/8 | 0 | 1 | −5 | 17 | 58 | −10 | 4 | −1 |
| 13/16 | 0 | 1 | −4 | 13 | 60 | −8 | 3 | −1 |
| 7/8 | 0 | 1 | −3 | 8 | 62 | −5 | 2 | −1 |
| 15/16 | 0 | 1 | −2 | 4 | 63 | −3 | 1 | 0 |

Affine motion model parameters or affine parameters (e.g., parameters in a 4-parameter affine motion model as shown in Eq. (1), parameters in a 6-parameter affine motion model as shown in Eq. (2)) can be used to derive a MV of each pixel (or sample) in a CU (e.g., a block, a luma block), for example, based on Eq. (1) or Eq. (2). However, due to the high complexity and memory access bandwidth requirements for performing pixel-based affine motion compensation, in some embodiments, a subblock-based affine motion compensation is implemented. In the subblock-based affine motion compensation, a current block (e.g., a CU) can be divided into subblocks and each of the subblocks can be assigned with a subblock MV derived from CPMVs of the current block. In an example, a size of the subblocks is 4×4 samples. The subblock-based affine motion compensation may improve coding efficiency and reduce coding complexity and memory access bandwidth.

In some embodiments, a prediction refinement with optical flow (PROF) (also referred to as a PROF method) may be implemented to improve the subblock-based affine motion compensation to have a finer granularity of motion compensation. In an embodiment, after the subblock-based affine motion compensation is performed, differences (or refinement values, refinements, prediction refinements) derived based on an optical flow equation can be added to predicted samples (e.g., luma predicted samples, or luma prediction samples) to obtain refined predicted samples.

Figure 12:
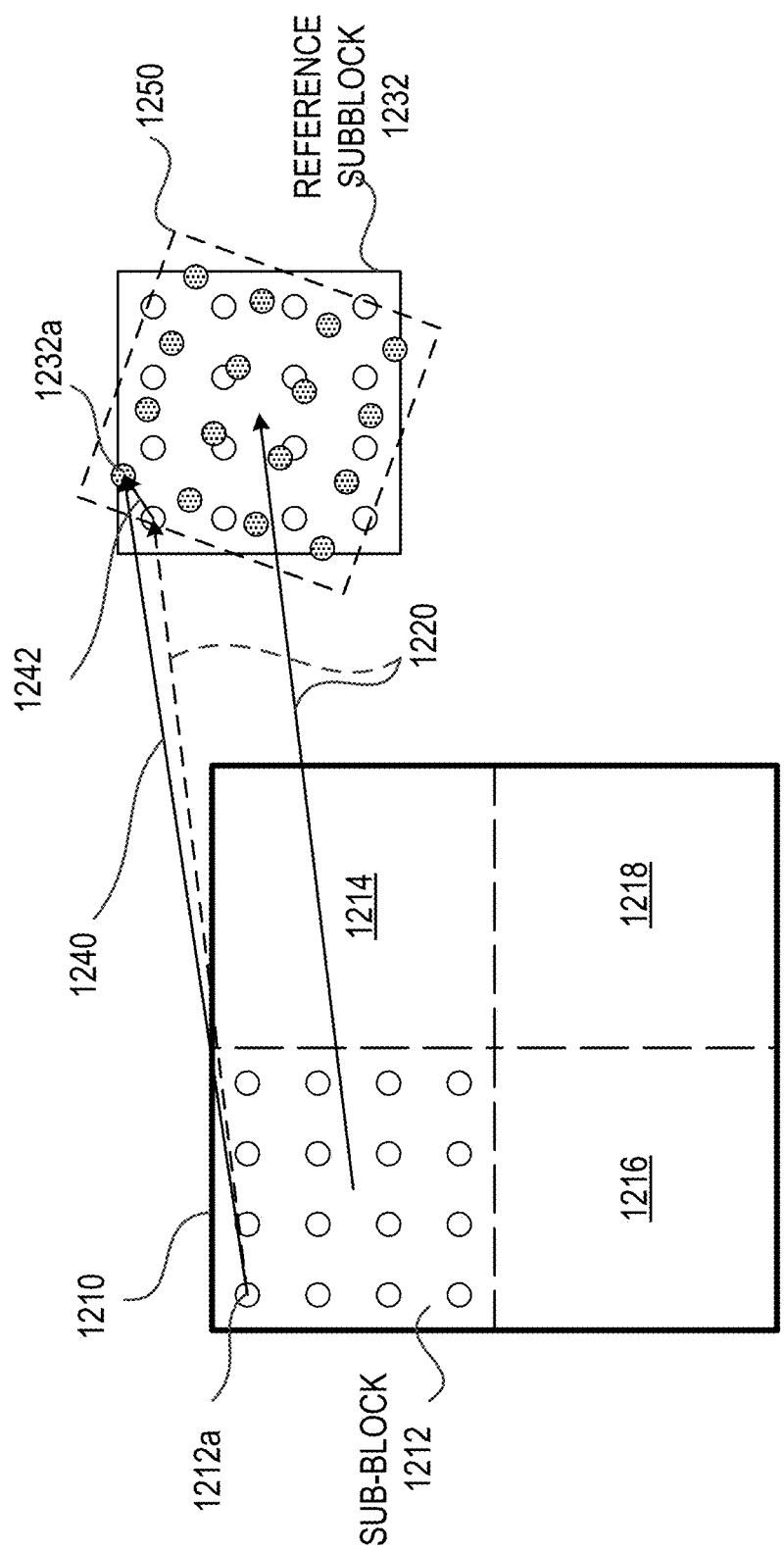
FIG. 12 shows an example of a prediction refinement with optical flow (PROF) method in accordance with an embodiment of the disclosure.

FIG. 12 shows a schematic illustration of an example of the PROF method in accordance with an embodiment of the disclosure. A current block (1210) can be divided into four subblocks (1212, 1214, 1216, and 1218). Each of the subblocks (1212, 1214, 1216, and 1218) can have a size of 4×4 pixels or samples. A subblock MV (1220) for the subblock (1212) can be derived according to CPMVs of the current block 1210, for example, using a center location of the subblock (1212) and an affine motion model (e.g., the 4-parameter affine motion model, the 6-parameter affine motion model). The subblock MV (1220) can point to a reference subblock (1232) in a reference picture. Initial subblock predicted samples can be determined according to the reference subblock (1232).

In some examples, a translational motion from the reference subblock (1232) to the subblock (1212) as described by the subblock MV (1220) may not predict the subblock (1212) with a high accuracy. In addition to the translational motion described by the subblock MV (1220), the subblock (1212) can also experience a non-translational motion (e.g., a rotation as seen in FIG. 12). Referring to FIG. 12, a subblock (1250) in the reference picture having shaded samples (e.g., a sample (1232a)) corresponds to and can be used to reconstruct the samples in the subblock (1212). The shaded sample (1232a) can be shifted by the pixel MV (1240) to reconstruct a sample (1212a) in the subblock (1212) with a high accuracy. Thus, in some examples, when non-translational motion occurs, to improve an accuracy of the prediction, a suitable prediction refinement method can be applied in an affine motion model, as described below.

In an example, the PROF method is implemented using the following four steps. In Step (1), the subblock-based affine motion compensation can be performed to generate a prediction, such as an initial subblock prediction I(i,j), for a current subblock (e.g., the subblock (1212)) where i and j are coordinates corresponding to a sample at position (i,j) (also referred to as a sample position, a sample location) in the current subblock (1212).

In Step (2), gradient calculations can be performed where spatial gradients $g_x(i,j)$ and $g_y(i,j)$ of the initial subblock prediction I(i,j) at each sample position (i,j) can be calculated using, for example, a 3-tap filter [−1, 0, 1] according to Eq. (3) and Eq. (4) as below:

$$g_x(i,j)=I(i+1,j)-I(i-1,j) \quad \text{(Eq. 3)}$$

$$g_y(i,j)=I(i,j+1)-I(i,j-1) \quad \text{(Eq. 4)}$$

The subblock prediction can be extended by one pixel on each side for the gradient calculations. In some embodiments, to reduce the memory bandwidth and complexity, the pixels on the extended borders can be copied from the nearest integer pixel position in the reference picture (e.g., the reference picture including the subblock (1232)). Therefore, additional interpolation for a padding region can be avoided.

In Step (3), a prediction refinement ΔI(i,j) can be calculated by Eq. (5) (e.g., an optical flow equation) as below.

$$\Delta I(i,j)=g_x(i,j)*\Delta mv_x(i,j)+g_y(i,j)*\Delta mv_y(i,j) \quad \text{(Eq. 5)}$$

where Δmv(i j) (e.g., ΔMV (1242)) is a difference MV between a pixel MV or a sample MV Mv(i,j) (e.g. pixel MV (1240)) for a sample location (i,j) and the subblock MV $Mv_{SB}$ (e.g., the subblock MV (1220)) of the subblock (e.g., the subblock (1212)) where the sample location (i,j) is located. Δmv(i,j) can be determined using Eq. (6) as below.

$$\Delta mv(i,j)=mv(i,j)-mv_{SB} \quad \text{(Eq. 6)}$$

$\Delta mv_x(i,j)$ and $\Delta mv_y(i,j)$ are an x component (e.g., a horizontal component) and a y component (e.g., a vertical component) of the difference MV Δmv(i,j), respectively.

Since the affine model parameters and the pixel locations relative to the subblock center position are not changed from one subblock to another subblock, Δmv(i,j) can be calculated for a first subblock (e.g., the subblock (1212)), and reused for other subblocks (e.g., the subblocks (1214), (1216), and (1218)) in the same current block (1210). In some examples, x and y represent a horizontal shift and a vertical shift of a sample position (i,j) with respect to the center position of the subblock (1212), $\Delta mv(i,j)$ (e.g., including $\Delta mv_x(i,j)$ and $\Delta mv_y(i,j)$) can be derived by Eq. (7) as below, $$\begin{cases} \Delta mv_x(x, y) = a*x + b*y \\ \Delta mv_y(x, y) = c*x + d*y \end{cases} \quad \text{(Eq. 7)}$$

where $\Delta mv_x(x,y)$ is the x component $\Delta mv_x(i,j)$ and $\Delta mv_y(x,y)$ is the y component $\Delta mv_y(i,j)$.

In an example, for a 4-parameter affine motion model, $$\begin{cases} a = d = \dfrac{mv_{1x} - mv_{0x}}{w} \\ c = -b = \dfrac{mv_{1y} - mv_{0y}}{w} \end{cases} \quad \text{(Eq. 8)}$$

for a 6-parameter affine motion model, $$\begin{cases} a = \dfrac{mv_{1x} - mv_{0x}}{w} \\ b = \dfrac{mv_{2x} - mv_{0x}}{h} \\ c = \dfrac{mv_{1y} - mv_{0y}}{w} \\ d = \dfrac{mv_{2y} - mv_{0y}}{h} \end{cases} \quad \text{(Eq. 9)}$$

where $(mv_{0x}, mv_{0y})$, $(mv_{1x}, mv_{1y})$, and $(mv_{2x}, mv_{2y})$ can be upper left, upper right, and lower left CPMVs, respectively, and w and h are a width and a height of the current block (1210) including the current subblock (1212).

In Step (4), the prediction refinement $\Delta I(i,j)$ (e.g., the luma prediction refinement) can be added to the initial subblock prediction $I(i,j)$ to generate another prediction, such as a refined prediction $I'(i,j)$. The refined prediction $I'(i,j)$ can be generated using Eq. (10) as below for the sample (i,j):

$$I'(i,j) = I(i,j) + \Delta I(i,j). \quad \text{(Eq. 10)}$$

In an embodiment, the 6-tap interpolation filter is used in the subblock-based affine motion compensation (or the subblock-based affine motion model) where affine subblocks have a size (also referred to as an affine subblock size) of 4×4 samples (e.g., 4×4 luma samples). When compared with the 8-tap interpolation filter, motion compensation using the 6-tap interpolation filter may have a lower complexity and memory bandwidth requirement. In some examples, a prediction accuracy may be increased when the 8-tap interpolation filter is used.

In an embodiment, in the PROF for a block (e.g., a luma block) coded with the affine motion model (e.g., the subblock-based affine motion model), the gradient calculations can be performed for each of 4×4 subblocks (e.g., luma subblocks), and each of the 4×4 luma subblocks can be padded into a size of 6×6 in order to perform the gradient calculations (e.g., the gradient calculations described by Eqs. (3)-(4)). However, a number of padding operations and gradient calculations can impact a complexity of the PROF.

According to aspects of the disclosure, coding information of a current block (CB) (e.g., the CB (900)) can be decoded from a coded video bitstream. The coding information can indicate that the CB is coded with a subblock-based affine motion model. The subblock-based affine motion model can include affine parameters that can be based on multiple CPMVs (e.g., $\vec{v_0}$ and $\vec{v_1}$ in FIG. 9) for the CB. Further, the CB can include an affine subblock (e.g., the subblock (902)) having a subblock MV (e.g., the subblock MVs (901)). The CB can include additional affine subblock(s) that have additional subblock MV(s).

Whether to select a subblock characteristic for generating a prediction for a sample in the affine subblock based on the subblock MV can be determined based on the coding information. In response to selecting the subblock characteristic, the subblock characteristic can be determined based on at least one of the affine parameters. The subblock characteristic can indicate one of: (i) a subblock size used for generating the prediction for the sample and (ii) an interpolation filter type for the affine subblock. Further, the sample in the affine subblock can be reconstructed based on the determined subblock characteristic.

The affine parameters can be determined based on the CPMVs of the CB. In an embodiment, the subblock-based affine motion model is based on the 4-parameter affine motion model, as shown in FIG. 8A and described by Eq. (1) or Eqs. (7) and (8). Referring to FIG. 8A, the CB (e.g., (810A)) includes a top left CP (e.g., CP0) having a first CPMV (e.g., $CPMV_0$) and a top right CP (e.g., CP1) having a second CPMV (e.g., $CPMV_1$). The affine parameters can include a first affine parameter $$\left(\text{e.g.,}\ a = \frac{mv_{1x} - mv_{0x}}{w}\right)$$

and a second affine parameter $$\left(\text{e.g.,}\ c = \frac{mv_{1y} - mv_{0y}}{w}\right).$$

The first affine parameter (e.g., 'a') can indicate a ratio of an x component of a first MV difference between the second CPMV and the first CPMV over a width (e.g., w) of the CB. The second affine parameter (e.g., 'c') can indicate a ratio of a y component of the first MV difference over the width of the CB.

In an embodiment, the subblock-based affine motion model is based on the 6-parameter affine motion model, as shown in FIG. 8B and described by Eq. (2) or Eqs. (7) and (9). Referring to FIG. 8B, the CB (e.g., (810B)) includes a top left CP (e.g., CP0) having a first CPMV (e.g., $CPMV_0$), a top right CP (e.g., CP1) having a second CPMV (e.g., $CPMV_1$), and a bottom left CP (e.g., CP2) having a third CPMV (e.g., $CPMV_2$). The affine parameters include a first affine parameter $$\left(\text{e.g.,}\ a = \frac{mv_{1x} - mv_{0x}}{w}\right),$$

a second affine parameter $$\left(\text{e.g.,}\ c = \frac{mv_{1y} - mv_{0y}}{w}\right),$$

a third affine parameter $$\left(e.g., b = \frac{mv_{2x} - mv_{0x}}{h}\right),$$

and a fourth affine parameter $$\left(e.g., d = \frac{mv_{2y} - mv_{0y}}{h}\right).$$

The first affine parameter and the second affine parameters can be identical to the first affine parameter and the second affine parameter in the 4-parameter affine motion model, and thus detailed descriptions are omitted for purposes of brevity. The third affine parameter (e.g., 'b') can indicate a ratio of an x component of a second MV difference between the third CPMV and the first CPMV over a height (e.g., h) of the CB. The fourth affine parameter (e.g., 'd') can indicate a ratio of a y component of the second MV difference over the height of the CB.

In an embodiment, one or more of the affine parameters represent an average MV difference of two adjacent pixels (or samples) along a direction (e.g., a horizontal direction (width), a vertical direction (height)) in the CB. For example, the first affine parameter 'a' and the second parameter 'c' represent an average MV difference (MVD) of two adjacent pixels along the horizontal direction (width). Further, the first affine parameter 'a' represents the x component, and the second affine parameter 'c' represents the y component. For example, the third affine parameter 'b' and the fourth parameter 'd' represent an average MVD of two adjacent pixels along the vertical direction (height). Further, the third affine parameter 'b' represents the x component, and the fourth affine parameter 'd' represents the y component.

In addition to or instead of including 'a', 'b', 'c', and/or 'd' as described above in the affine parameters, the affine parameters can include other parameters to describe various motions of the CB, such as zooming in/zooming out (also referred to as scaling), rotation, and/or the like.

In addition to the affine parameters described above, translational motion related parameters 'e' and 'f' (or translational motion parameters, translational parameters) can be derived using Eq. (11) as below.

$$\begin{cases} e = mv_{0x} \\ f = mv_{0y} \end{cases} \quad \text{Eq. (11)}$$

In an example, the 4-parameter affine motion model can be described using 4 parameters, such as the first affine parameter $$\left(e.g., a = \frac{mv_{1x} - mv_{0x}}{w}\right),$$

the second affine parameter $$\left(e.g., c = \frac{mv_{1y} - mv_{0y}}{w}\right),$$

e, and f. In an example, the 6-parameter affine motion model can be described using 6 parameters, such as the first affine parameter $$\left(e.g., a = \frac{mv_{1x} - mv_{0x}}{w}\right),$$

the second affine parameter $$\left(e.g., c = \frac{mv_{1y} - mv_{0y}}{w}\right),$$

the third affine parameter $$\left(e.g., b = \frac{mv_{2x} - mv_{0x}}{h}\right),$$

and the fourth affine parameter $$\left(e.g., d = \frac{mv_{2y} - mv_{0y}}{h}\right),$$

e, and f.

In an embodiment, the subblock size is an affine subblock size of the affine subblock in the CB. The interpolation filter type can be an interpretation filter having any suitable length. In an example, the interpolation filter type is a first interrelation filter having a first length (e.g., a 6-tap) or a second interpolation filter having a second length (e.g., an 8-tap) filter, and the first length is less than the second length. The subblock characteristic can indicate the affine subblock size or the interpolation filter type. The subblock characteristic can be determined based on the at least one of the affine parameters and one of: (i) a threshold and (ii) a pre-defined range.

In an example, one or more processes used for the affine motion compensation and/or affine refinement (e.g., PROF) can be conditionally selected based on the at least one of the affine parameters and the threshold (or the pre-defined range).

In an embodiment, the threshold may be a predefined value that is known to an encoder and a decoder. The threshold is not signaled. In an embodiment, the threshold may be signaled at a higher level (e.g., a level that is higher than a CU level), such as in a sequence level, a picture level, a tile level, a tile group level, a slice level, or the like.

According to aspects of the disclosure, the affine subblock size and/or the interpolation filter type (e.g., an affine subblock interpolation filter having 6-tap or 8-tap) can be conditionally selected based on a comparison of the at least one affine parameters (or affine related parameters) and the threshold. In an embodiment, when the affine parameters lead to relatively large MV differences (e.g., based on the comparison between the at least one affine parameters and the threshold) among neighboring subblocks, a small size (e.g., 4×4 samples) may be used for the affine subblock. Otherwise, a large size (e.g., 8×8 samples) can be used. Further, a number of taps of an interpolation filter used for a small affine subblock size can be less than a number of taps of an interpolation filter used for a large affine subblock size. For example, when using a small affine subblock size, the 6-tap interpolation filter may be used to reduce a complexity and a memory bandwidth. The 8-tap interpolation filter can be used for a large affine subblock size. In an example, the affine subblock size (e.g., an affine luma subblock size) is 4×4 samples and the 6-tap interpolation filter is used.

As described above, the affine parameters may be calculated using the CPMVs of the CB. In an example, the affine parameters include a, b, c, and d corresponding to the first affine parameter, the second affine parameter, the third affine parameter, and the fourth affine parameter. For the 4-parameter affine motion model, the affine parameters including a, b, c, and d can be described by Eq. (8). For the 6-parameter affine motion model, the affine parameters including a, b, c, and d can be described by Eq. (9). $(mv_{0x}, mv_{0y})$, $(mv_{1x}, mv_{1y})$, $(mv_{2x}, mv_{2y})$ are the top-left, top-right, and bottom-left CPMVs, w is the width, and h is the height of the CB.

The affine subblock size (e.g., 4×4, 8×8) may be conditionally determined based on the at least one of the affine parameters.

In an embodiment, the at least one of the affine parameters includes a plurality of the affine parameters. Whether absolute values of the plurality of the affine parameters satisfy a pre-defined condition can be determined. The pre-defined condition can be one of: (i) a maximum of the absolute values is larger than the threshold, (ii) the maximum of the absolute values is larger than or equal to the threshold, (iii) a minimum of the absolute values is larger than the threshold, (iv) the minimum of the absolute values is larger than or equal to the threshold, and (v) the absolute values are outside the pre-defined range.

In response to the absolute values satisfying the pre-defined condition, the subblock characteristic can be determined to indicate that the affine subblock size is a first size (e.g., 4×4 samples) and/or the interpolation filter type is the first interpolation filter (e.g., the 6-tap interpolation filter). For example, the absolute values satisfying the pre-defined condition indicates that the affine parameters lead to relatively large MV differences among neighboring subblocks, and thus using a smaller size (e.g., 4×4) of the first size and a second size (e.g., 8×8) as the affine subblock size may improve, for example, a prediction accuracy. The second size is larger than the first size.

In response to the absolute values not satisfying the pre-defined condition, the subblock characteristic can be determined to indicate that the affine subblock size is the second size (e.g., 8×8 samples) and/or the interpolation filter type is the second interpolation filter (e.g., the 8-tap interpolation filter). For example, the absolute values not satisfying the pre-defined condition indicates that the affine parameters lead to relatively small MV differences among the neighboring subblocks, and thus using a larger size (e.g., 8×8) of the first size and the second size as the affine subblock size may achieve a similar prediction accuracy as using the smaller size (e.g., the first size of 4×4). In an example, using the larger size (e.g., the second size of 8×8) improves prediction efficiency.

The threshold may be set to any suitable value, such as a value equivalent to ¼ samples (e.g., ¼ luma samples), a value equivalent to ⅛ samples (e.g., ⅛ luma samples), or the like. In an example, ¼ samples indicate a MV difference (e.g., an x component of the MV difference, a y component of the MV difference) between two adjacent samples is ¼ samples or pixels.

The threshold is not limited the above examples (e.g., ¼ luma samples), a value equivalent to ⅛ samples (e.g., ⅛ luma samples). As described above, the threshold can be the predefined value that is known to a decoder, and thus is not signaled. Alternatively, the threshold may be signaled explicitly.

In an embodiment, the plurality of the affine parameters includes a, b, c, and d for either the 4- or the 6-parameter affine motion model. The maximum of the absolute values of the plurality of the affine parameters is denoted as max_parameter (e.g., max_parameter=max{|a|, |b|, |c|, |d|}). The affine subblock size can be smaller when the maximum of the absolute values is greater than or equal to the threshold. In a first example, for the CB, when the maximum of the absolute values (e.g., max_parameter) is above the threshold, the affine subblock size may be set to 4×4 samples (e.g., 4×4 luma samples). Otherwise, when the maximum of the absolute values is equal to or less than the threshold, the affine subblock size may be set to 8×8 samples (e.g., 8×8 luma samples). In a second example, when the maximum of the absolute values (e.g., max_parameter) is above or equal to the threshold, the affine subblock size may be set to 4×4 samples (e.g., 4×4 luma samples). Otherwise, when the maximum of the absolute values is less than the threshold, the affine subblock size may be set to 8×8 samples (e.g., 8×8 luma samples).

In an embodiment, the plurality of the affine parameters includes a, b, c, and d for either the 4- or the 6-parameter affine motion model. The maximum of the absolute values of the plurality of the affine parameters is denoted as max_parameter (e.g., max_parameter=max{|a|, |b|, |c|, |d|}). The affine subblock size can be larger when the maximum of the absolute values is greater than or equal to the threshold. In a first example, for the CB, when the maximum of the absolute values (e.g., max_parameter) is above the threshold, the affine subblock size may be set to 8×8 samples (e.g., 8×8 luma samples). Otherwise, when the maximum of the absolute values is equal to or less than the threshold, the affine subblock size may be set to 4×4 samples (e.g., 4×4 luma samples). In a second example, when the maximum of the absolute values (e.g., max_parameter) is above or equal to the threshold, the affine subblock size may be set to 8×8 samples (e.g., 8×8 luma samples). Otherwise, when the maximum of the absolute values is less than the threshold, the affine subblock size may be set to 4×4 samples (e.g., 4×4 luma samples).

In an embodiment, the plurality of the affine parameters includes a, b, c, and d for either the 4- or the 6-parameter affine motion model. The minimum of the absolute values of the plurality of the affine parameters is denoted as min_parameter (e.g., min_parameter=min{|a|, |b|, |c|, |d|}). The affine subblock size can be smaller when the minimum of the absolute values is greater than or equal to the threshold. In a first example, for the CB, when the minimum of the absolute values (e.g., min_parameter) is above the threshold, the affine subblock size may be set to 4×4 samples (e.g., 4×4 luma samples). Otherwise, when the minimum of the absolute values is equal to or less than the threshold, the affine subblock size may be set to 8×8 samples (e.g., 8×8 luma samples). In a second example, when the minimum of the absolute values (e.g., min_parameter) is above or equal to the threshold, the affine subblock size may be set to 4×4 samples (e.g., 4×4 luma samples). Otherwise, when the minimum of the absolute values is less than the threshold, the affine subblock size may be set to 8×8 samples (e.g., 8×8 luma samples).

In an embodiment, the plurality of the affine parameters includes a, b, c, and d for either the 4- or the 6-parameter affine motion model. The minimum of the absolute values of the plurality of the affine parameters is denoted as min_parameter (e.g., min_parameter=min{|a|, |b|, |c|, |d|}). The affine subblock size can be larger when the minimum of the absolute values is greater than or equal to the threshold. In a first example, for the CB, when the minimum of the absolute values (e.g., min_parameter) is above the threshold, the affine subblock size may be set to 8×8 samples (e.g., 8×8 luma samples). Otherwise, when the minimum of the absolute values is equal to or less than the threshold, the affine subblock size may be set to 4×4 samples (e.g., 4×4 luma samples). In a second example, when the minimum of the absolute values (e.g., min_parameter) is above or equal to the threshold, the affine subblock size may be set to 8×8 samples (e.g., 8×8 luma samples). Otherwise, when the minimum of the absolute values is less than the threshold, the affine subblock size may be set to 4×4 samples (e.g., 4×4 luma samples).

In an embodiment, the plurality of the affine parameters includes a, b, c, and d for either the 4- or the 6-parameter affine motion model. The affine subblock size can be set based on whether one or more of the plurality of affine parameters falls within a predefined range. In an example of the CB, when the absolute values of the plurality of the affine parameter are in the predefined range (or a predefined value range), the affine subblock size may be set to 8×8 samples (e.g., 8×8 luma samples). Otherwise, if any of the absolute values is outside the predefined range, the affine subblock size may be set to 4×4 samples (e.g., 4×4 luma samples). The predefined range may be denoted as [M, N], where M and N are positive numbers. M and N can be predefined, or signaled in the coded bitstream, such as in a sequence parameter set (SPS), a picture parameter set (PPS), a tile group header, a tile header, a slice header, or the like.

Interpolation filter usage, such as whether using the 6-tap interpolation filter or the 8-tap interpolation filter for the affine motion model (e.g., the subblock-based affine motion model), may be conditionally determined based on the affine parameters.

In an embodiment, the plurality of the affine parameters includes a, b, c, and d for either the 4- or the 6-parameter affine motion model. The maximum of the absolute values of the plurality of the affine parameters is denoted as max_parameter (e.g., max_parameter=max{|a|, |b|, |c|, |d|}). A number of taps used for an interpolation filter can be smaller when the maximum of the absolute values is greater than or equal to the threshold. In a first example, for the CB, when the maximum of the absolute values (e.g., max_parameter) is above the threshold, the 6-tap interpolation filter can be used in the subblock-based affine motion model (or the affine subblock-based motion compensation). Otherwise, when the maximum of the absolute values is equal to or less than the threshold, the 8-tap interpolation filter can be used in the subblock-based affine motion model. In a second example, when the maximum of the absolute values (e.g., max_parameter) is above or equal to the threshold, the 6-tap interpolation filter can be used in the subblock-based affine motion model. Otherwise, when the maximum of the absolute values is less than the threshold, the 8-tap interpolation filter can be used in the subblock-based affine motion model.

In an embodiment, the plurality of the affine parameters includes a, b, c, and d for either the 4- or the 6-parameter affine motion model. The maximum of the absolute values of the plurality of the affine parameters is denoted as max_parameter (e.g., max_parameter=max{|a|, |b|, |c|, |d|}). A number of taps used for an interpolation filter can be larger when the maximum of the absolute values is greater than or equal to the threshold. In a first example, for the CB, when the maximum of the absolute values (e.g., max_parameter) is above the threshold, the 8-tap interpolation filter can be used in the subblock-based affine motion model (or the affine subblock-based motion compensation). Otherwise, when the maximum of the absolute values is equal to or less than the threshold, the 6-tap interpolation filter can be used in the subblock-based affine motion model. In a second example, when the maximum of the absolute values (e.g., max_parameter) is above or equal to the threshold, the 8-tap interpolation filter can be used in the subblock-based affine motion model. Otherwise, when the maximum of the absolute values is less than the threshold, the 6-tap interpolation filter can be used in the subblock-based affine motion model.

In an embodiment, the plurality of the affine parameters includes a, b, c, and d for either the 4- or the 6-parameter affine motion model. The minimum of the absolute values of the plurality of the affine parameters is denoted as min_parameter (e.g., min_parameter=min{|a|, |b|, |c|, |d|}). A number of taps used for an interpolation filter can be smaller when the minimum of the absolute values is greater than or equal to the threshold. In a first example, for the CB, when the minimum of the absolute values (e.g., min_parameter) is above the threshold, the 6-tap interpolation filter can be used in the subblock-based affine motion model (or the affine subblock-based motion compensation). Otherwise, when the minimum of the absolute values is equal to or less than the threshold, the 8-tap interpolation filter can be used in the subblock-based affine motion model. In a second example, when the minimum of the absolute values (e.g., min_parameter) is above or equal to the threshold, the 6-tap interpolation filter can be used in the subblock-based affine motion model. Otherwise, when the minimum of the absolute values is less than the threshold, the 8-tap interpolation filter can be used in the subblock-based affine motion model.

In an embodiment, the plurality of the affine parameters includes a, b, c, and d for either the 4- or the 6-parameter affine motion model. The minimum of the absolute values of the plurality of the affine parameters is denoted as min_parameter (e.g., min_parameter=min{|a|, |b|, |c|, |d|}). A number of taps used for an interpolation filter can be larger when the maximum of the absolute values is greater than or equal to the threshold. In a first example, for the CB, when the minimum of the absolute values (e.g., min_parameter) is above the threshold, the 8-tap interpolation filter can be used in the subblock-based affine motion model (or the affine subblock-based motion compensation). Otherwise, when the minimum of the absolute values is equal to or less than the threshold, the 6-tap interpolation filter can be used in the subblock-based affine motion model. In a second example, when the minimum of the absolute values (e.g., min_parameter) is above or equal to the threshold, the 8-tap interpolation filter can be used in the subblock-based affine motion model. Otherwise, when the minimum of the absolute values is less than the threshold, the 6-tap interpolation filter can be used in the subblock-based affine motion model.

In an embodiment, the plurality of the affine parameters includes a, b, c, and d for either the 4- or the 6-parameter affine motion model. An interpolation filter (e.g., a first and a second interpolation filter including different numbers of taps) can be set based on whether one or more of the plurality of affine parameters falls within a predefined range. In an example of the CB, when the absolute values of the plurality of the affine parameter are in the predefined range (or the predefined value range), the 8-tap interpolation filter can be used in the subblock-based affine motion model. Otherwise, if any of the absolute values is outside the predefined range, the 6-tap interpolation filter can be used in the subblock-based affine motion model. The predefined range may be denoted as [M, N], where M and N are positive numbers. M and N can be predefined, or signaled in the coded bitstream, such as in a sequence parameter set (SPS), a picture parameter set (PPS), a tile group header, a tile header, a slice header, or the like.

A conditional selection of the affine subblock size and/or the affine subblock interpolation filter (e.g., the 6-tap interpolation filter, the 8-tap interpolation filter), such as described in the disclosure, may be enabled or disabled by a syntax (e.g., a high level syntax), such as at a sequence level, a picture level, a slice level, a tile level, a tile group level, or the like. In an example, the syntax is signalled explicitly.

In an example, the CB is a luma block and the affine subblock size is set to 8×8 luma samples, a chroma subblock size is 4×4. MVs of a chroma block may be calculated directly instead of using averaged luma MV values.

In an embodiment, the CB includes a gradient subblock used for gradient calculations in a PROF for the CB. The subblock size is a size of the gradient subblock. The gradient calculations can be block-based gradient calculations (also referred to as whole block based gradient calculations) where the gradient subblock is the CB and the subblock size is equal to a block size of the CB. Alternatively, the gradient calculations can be subblock-based gradient calculations. The CB includes the gradient subblock and additional gradient subblocks, and thus the subblock size is less than the block size.

In an embodiment, the at least one of the affine parameters can include a plurality of the affine parameters. Whether the gradient calculations are block-based or subblock-based can be determined based on a maximum or a minimum of the absolute values of the plurality of the affine parameters and a gradient threshold. The gradient threshold can be identical to or different from the threshold. Alternatively, whether the gradient calculations are block-based or subblock-based can be determined based on the absolute values and a gradient pre-defined range. The gradient pre-defined range can be identical to or different from the pre-defined range.

In an example of a PROF for the subblock-based affine motion model, inter prediction (interpolation) can be performed for each of the affine subblocks in the CB, for example, for each 4×4 affine subblock. The gradient calculations can be calculated with a 3-tap filter [1 0 −1] based on prediction outputs of the affine subblock, and refinements can be applied on the affine subblock subsequently. To calculate gradients for the affine subblock, the affine subblock can be padded to a larger size, for example, extending 1 pixel on each side of the affine subblock.

Figure 13:
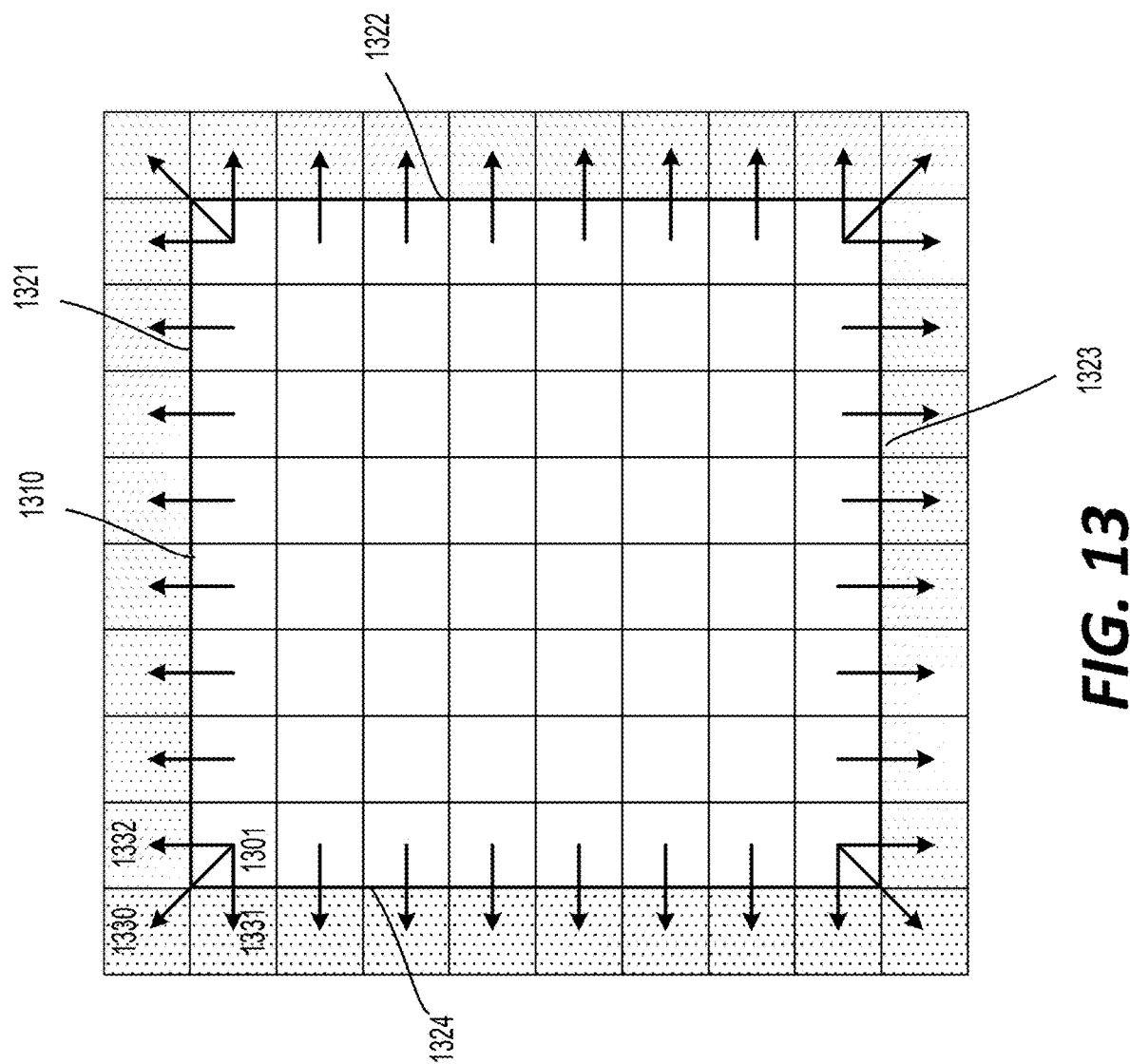
FIG. 13 shows an example of padding a CB in block-based gradient calculations in accordance with an embodiment of the disclosure.

The gradient calculations may be done for the whole CB (e.g., a CB 1310 in FIG. 13) when the inter prediction (interpolation) for all the affine subblocks are finished, and the gradient calculations are referred to as the block-based gradient calculations. In the block-based gradient calculations, extending each affine subblock for the gradient calculations may not be necessary. Instead, the whole CB may be extended by (or padded with) 1 pixel on each border of the CB for the gradient calculations, which can be less complex than extending boundaries for each affine subblock. Referring to FIG. 13, a CB (1310) may be padded by 1 pixel on borders (1321)-(1324). Prediction refinement may be done for each affine subblock based on the gradients of the affine subblock obtained from the block-based gradient calculations. For example, when MV differences between neighboring affine subblocks are small, block-based gradient calculations as the prediction of neighboring blocks can be similar or even more accurate than the subblock-based gradient calculations. When the MV differences are large, the subblock-based gradient calculations can be used.

The block-based or subblock-based gradient calculations can be switchable based on a condition. When the condition is met, the block-based gradient calculations can be used, and thus the gradient calculations are done for the whole CB. Otherwise, if the condition is not met, the subblock-based gradient calculations can be used, and thus the gradient calculations and a padding process can be done for each of the affine subblocks. A plurality of conditions for selecting between the block-based or subblock-based gradient calculations can be utilized in some embodiments. Further, a condition can be based on a one or more affine parameters and a threshold or range.

In an embodiment, the certain condition is that the maximum of the absolute values of the affine parameter a, b, c, and d (e.g., max_parameter=max{|a|, |b|, |c|, |d|}) is below or no larger than a threshold. In an example, the threshold may correspond to 1 pixel per sample (or pixel/sample), 0.5 pixels per sample, or the like. For example, the threshold is 1 pixel/sample, indicating a component (e.g., x component, y component) of an MV difference over a sample (or the component of the MVD between two adjacent samples) is 1 pixel. When max_parameter=|a|, the width w of the CB is 4 samples, and v1x-v0x is 1 pixel, max_parameter=1 pixel/4 samples=0.25 pixels/sample. Therefore, max_parameter is less than the threshold, and thus, any component (e.g., an x component or a y component) of an averaged MV difference of two adjacent samples in the CB is less than the gradient threshold.

In an embodiment, the threshold corresponds to 1 pixel per sample, or half pixels per sample, or the like. In an example, an internal affine motion uses (7+4)=11 bits (e.g., a value of $2^{11}$=2048 corresponds to a 1 pixel displacement) and a subblock size is 4×4 samples. The threshold of 1 pixel per sample corresponds to a value of 512 (e.g., $2^{11}/4$). The threshold of half pixels per sample corresponds to a value of 256.

In an embodiment, the condition to use the subblock-based gradient calculations can be that the minimum of the absolute values of the affine parameters a, b, c, and d (e.g., min_parameter=min{|a|, |b|, |c|, |d|}) is above or no smaller than a threshold.

In an embodiment, the condition to use the block-based gradient calculations can be that the absolute values of the affine parameter a, b, c, and d, are in a predefined range. The pre-defined range may be denoted as [M, N] where M and N are positive numbers. M and N can be predefined or signaled in the coded bitstream, such as in a SPS, a PPS, a tile group header, a tile header, a slice header, or the like.

In an embodiment, the padding for the whole CB is used, such as in the block-based gradient calculations. A neighboring sample of the CB can be padded (or generated) by interpolating using a corresponding subblock MV of a subblock that includes the neighboring sample. The neighboring sample can be generated by copying from a nearest integer sample position in a reference picture for the CB. The neighboring sample can be generated by copying from a prediction of a closest sample in the CB.

Referring to FIG. 13, the neighboring sample (1330) can be generated by copying from a prediction of a closest sample (1301) in the CB (1310). Similarly, the neighboring samples (1331) and (1332) can be generated by copying from the prediction of the closest sample (1301).

In an embodiment, the subblock size is one of: a width of the affine subblock, a height of the affine subblock, a width of an affine PROF subblock used in the PROF for the CB, a height of the affine PROF subblock, a width of a gradient subblock used in gradient calculations in the PROF, and a height of the gradient subblock. The interpolation filter type is one of: (i) a first interpolation filter having the first length (e.g., a 6-tap) for horizontal interpolation, (ii) a second interpolation filter having the second length (e.g., an 8-tap) for the horizontal interpolation, (iii) a first interpolation filter having the first length for vertical interpolation, and (iv) a second interpolation filter having the second length for the vertical interpolation. As described above, the second length is larger than the first length.

When the CB is coded with the subblock-based affine motion model, each of the following may be conditionally switchable based on the at least one of the affine parameters: the affine subblock size, the width of the affine subblock, the height of the affine subblock, the interpolation filter type, an affine PROF subblock size, the width of the affine PROF subblock, the height of the affine PROF subblock, a gradient subblock size, the width of the gradient subblock, and the height of the gradient subblock.

In an embodiment, an interpolation filter tap length (e.g., 6-tap, 8-tap) and/or parameters for the subblock-based affine motion compensation may be selected separately for the horizontal interpolation and the vertical interpolation.

In an embodiment, a width and a height of a subblock (e.g., an affine subblock, an affine PROF subblock, a gradient subblock) may be chosen separately according to the at least one of the affine parameters.

In an embodiment, the affine parameters used in a condition checking may be a subset of the affine parameters or a combination of one or more of the affine parameters.

In an embodiment, different affine parameters or different subsets of the affine parameters may be used separately for condition checks for multiple switchable subblock characteristics. As described above, the subblock characteristic (e.g., the affine subblock size) can be determined based on the at least one (e.g., a maximum value of $\{|a|, |c|\}$) of the affine parameters. In an example, another subblock characteristic (e.g., the interpolation filter type) is determined based on at least another one (e.g., a minimum value of $\{|a|, |c|\}$, a maximum value of $\{|a|, |b|, |c|, |d|\}$) of the affine parameters. The at least another one of the affine parameters can be different from or identical to the at least one of the affine parameters, and the other subblock characteristic can be different from the subblock characteristic.

In an embodiment, one or more conditions applied on the selected affine parameters may be one of the followings or any combination of the followings: a minimum value, a maximum value, a minimum absolute value, a maximum absolute value, a range of values, and/or a mean value. In an example, the at least one of the affine parameters includes the plurality of the affine parameters. The subblock characteristic can be determined based on one of (i) a threshold and a minimum value, a maximum value, a minimum absolute value, a maximum absolute value, or a mean value of the plurality of the affine parameters and (ii) a pre-defined range (e.g., [M, N]) and a value range of the plurality of the affine parameters.

In some examples, the 6-parameter affine motion model is used as an example. The affine parameters a, b, c and d described above using Eq. (7) and (9) can be used for determining the affine subblock size, the interpolation filter type (or the interpolation filter tap length), the applicability of a PROF process on affine, and/or the like. The descriptions can be suitably adapted to other affine motion model(s) (e.g., the 4-parameter affine motion model).

In an embodiment, the at least one of the affine parameters includes the plurality of the affine parameters. The subblock size is one of: the width of the affine subblock, the height of the affine subblock, the width of the affine PROF subblock, the height of the affine PROF subblock, the width of the gradient subblock, and the height of the gradient subblock. The interpolation filter type is one of: (i) the first interpolation filter (e.g., the 6-tap interpolation filter) for the horizontal interpolation, (ii) the second interpolation filter (e.g., the 8-tap interpolation filter) for the horizontal interpolation, (iii) the first interpolation filter (e.g., the 6-tap interpolation filter) for the vertical interpolation, and (iv) the second interpolation filter (e.g., the 8-tap interpolation filter) for the vertical interpolation.

The subblock characteristic can be determined based on the maximum absolute value of the plurality of the affine parameters and a threshold. In an embodiment, in response to the maximum absolute value being larger than the threshold, the subblock characteristic can be determined to indicate one of: (i) the subblock size being the first size (e.g., 4 samples), (ii) the interpolation filter type being the first interpolation filter (e.g., the 6-tap interpolation filter) for the horizontal interpolation, and (iii) the interpolation filter type being the first interpolation filter (e.g., the 6-tap interpolation filter) for the vertical interpolation. In response to the maximum absolute value being less than or equal to the threshold, the subblock characteristic can be determined to indicate one of: (i) the subblock size being the second size (e.g., 8 samples), (ii) the interpolation filter type being the second interpolation filter (e.g., the 8-tap interpolation filter) for the horizontal interpolation, and (iii) the interpolation filter type being the second interpolation filter (e.g., the 8-tap interpolation filter) for the vertical interpolation.

In an embodiment, in response to the maximum absolute value being larger than or equal to the threshold, the subblock characteristic can be determined to indicate one of: (i) the subblock size being 4 samples, (ii) the interpolation filter type being the 6-tap interpolation filter for the horizontal interpolation, and (iii) the interpolation filter type being the 6-tap interpolation filter for the vertical interpolation. In response to the maximum absolute value being less than the threshold, the subblock characteristic can be determined to indicate one of: (i) the subblock size being more than 4 samples, (ii) the interpolation filter type being the 8-tap interpolation filter for the horizontal interpolation, and (iii) the interpolation filter type being the 8-tap interpolation filter for the vertical interpolation.

A width of an affine subblock can be set based on one or more affine parameters. In one embodiment, for the CB, when a maximum of the absolute values of the affine parameters a and b (e.g., denoted as max_param_hor=max$\{|a|, |b|\}$) is larger than the threshold, the width of the affine subblock may be set to 4 samples (e.g., 4 luma samples). Otherwise, when max_param_hor is equal to or smaller than the threshold, the width of the affine subblock may be set to K samples (e.g., luma samples). In an example, K is larger than 4, such as 8. In one embodiment, for the CB, when the maximum of the absolute values of the affine parameters a and b is larger than or equal to the threshold, the width of the affine subblock may be set to 4 samples (e.g., 4 luma samples). Otherwise, when max_param_hor is smaller than the threshold, the width of the affine subblock may be set to K samples (e.g., luma samples). In an example, K is larger than 4, such as 8.

A height of an affine subblock can be set based on one or more affine parameters. In an embodiment, for the CB, when a maximum of the absolute values of the affine parameters c and d (e.g., denoted as max_param_ver=max{|c|, |d|}) is above the threshold, the height of the affine subblock may be set to 4 samples. Otherwise, when max_param_hor is equal to or below the threshold, the height of the affine subblock may be set to K samples. In an example, K is larger than 4, such as 8. In an embodiment, for the CB, when the maximum of the absolute values of the affine parameters c and d is above or equal to the threshold, the height of the affine subblock may be set to 4 samples. Otherwise, when max_param_hor is below the threshold, the height of the affine subblock may be set to K samples. In an example, K is larger than 4, such as 8.

A width and a height of an affine subblock can be set separately based on a first subset and a second subset of the affine parameters, respectively. Alternatively, an area including the width and the height of the affine subblock can be set based on one or more of the affine parameters.

An interpolation filter (e.g., first and second interpolation filters including different numbers of taps) can be set based on one or more affine parameters. In one embodiment, for the CB, when the maximum of the absolute values of affine parameters a and b is above the threshold, the subblock-based affine motion compensation (e.g., the subblock-based affine motion compensation for a luma block) may use the 6-tap interpolation filter (e.g., a 6-tap interpolation filter for luma samples) for the horizontal interpolation. Otherwise, when max_param_hor is equal to or below the threshold, the subblock-based affine motion compensation may use the 8-tap interpolation filter for the horizontal interpolation. In one embodiment, for the CB, when the maximum of the absolute values of affine parameters a and b is above or equal to the threshold, the subblock-based affine motion compensation may use the 6-tap interpolation filter for the horizontal interpolation. Otherwise, when max_param_hor is below the threshold, the subblock-based affine motion compensation may use the 8-tap interpolation filter for the horizontal interpolation.

In one embodiment, for the CB, when the maximum of the absolute values of the affine parameters c and d is above the threshold, the subblock-based affine motion compensation (e.g., the subblock-based affine motion compensation for the luma block) may use the 6-tap interpolation filter (e.g., the 6-tap interpolation filter for luma samples) for the vertical interpolation. Otherwise, when max_param_ver is equal to or below the threshold, the subblock-based affine motion compensation may use the 8-tap interpolation filter for the vertical interpolation. In one embodiment, for the CB, when the maximum of the absolute values of the affine parameters c and d is above or equal to the threshold, the subblock-based affine motion compensation may use the 6-tap interpolation filter for the vertical interpolation. Otherwise, when max_param_ver is below the threshold, the subblock-based affine motion compensation may use the 8-tap interpolation filter for the vertical interpolation.

A width of an affine PROF subblock can be set based on one or more affine parameters. In one embodiment, for the CB, when the maximum of the absolute values of the affine parameters a and b is above the threshold, the affine PROF may be performed based on the width of the affine PROF subblock being 4 samples (e.g., luma samples). Otherwise, when max_param_hor is equal to or below the threshold, the affine PROF may be performed based on width of the affine PROF subblock being K samples (e.g., luma samples). In an example, K is larger than 4, such as 8. In an embodiment, for the CB, when the maximum of the absolute values of the affine parameters a and b is above or equal to the threshold, the affine PROF may be performed based on the width of the affine PROF subblock being 4 samples (e.g., luma samples). Otherwise, when max_param_hor is below the threshold, the affine PROF may be performed based on width of the affine PROF subblock being K samples (e.g., luma samples). In an example, K is larger than 4, such as 8.

A height of an affine PROF subblock can be set based on one or more affine parameters. In an embodiment, for the CB, when the maximum of the absolute values of the affine parameters c and d is above the threshold, the affine PROF may be performed based on the height of the affine PROF subblock being 4 samples (e.g., luma samples). Otherwise, when max_param_hor is equal to or below the threshold, the affine PROF may be performed based on the height of the affine PROF subblock being K samples. In an example, K is larger than 4, such as 8. In an embodiment, for the CB, when the maximum of the absolute values of the affine parameters c and d is above or equal to the threshold, the affine PROF may be performed based on the height of the affine PROF subblock being 4 samples (e.g., luma samples). Otherwise, when max_param_hor is below the threshold, the affine PROF may be performed based on the height of the affine PROF subblock being K samples. In an example, K is larger than 4, such as 8.

A width and a height of an affine PROF subblock can be set separately based on a first subset and a second subset of the affine parameters, respectively. Alternatively, an area including the width and the height of the affine PROF subblock can be set based on one or more of the affine parameters.

Figure 14:
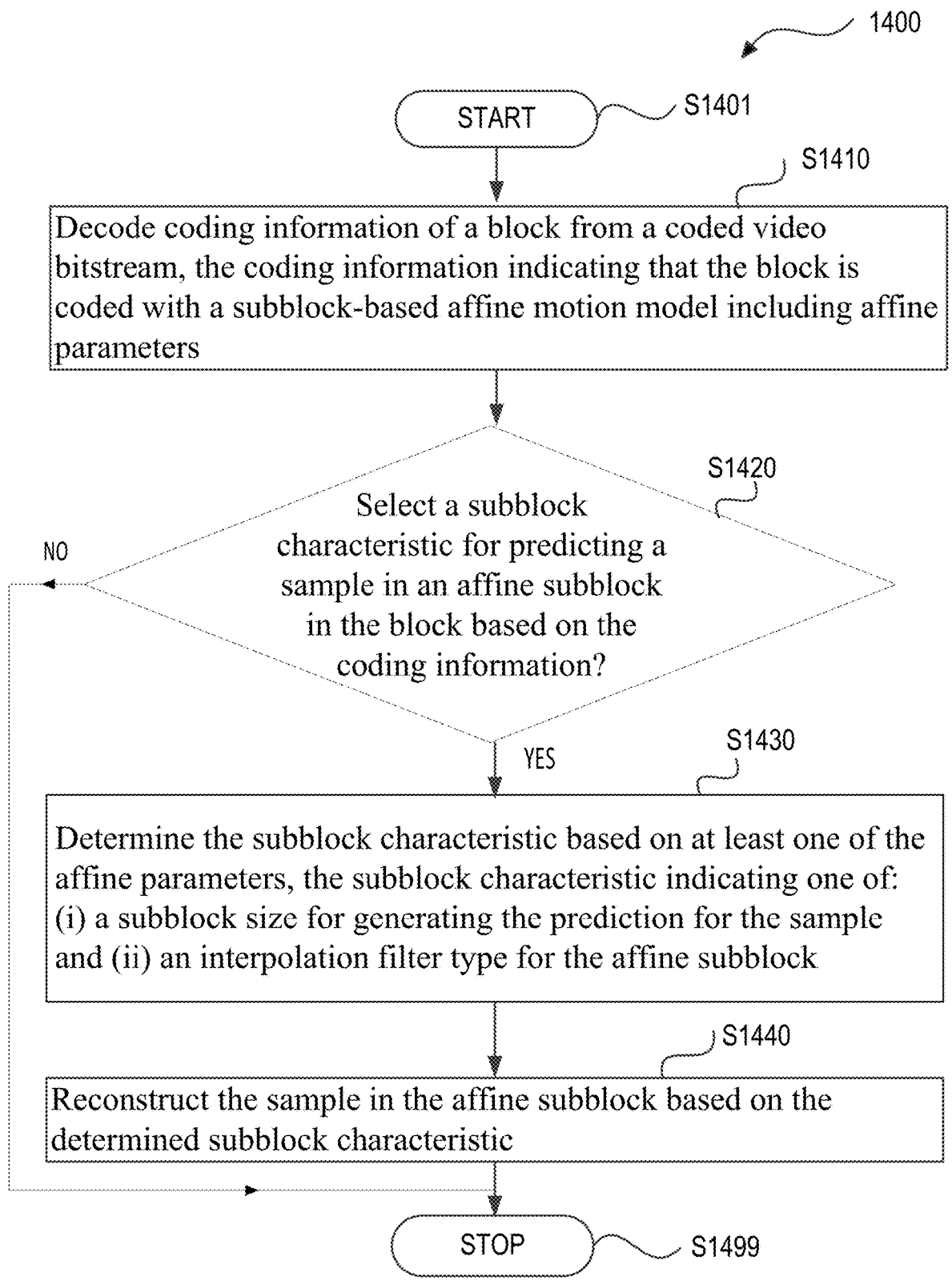
FIG. 14 shows a flow chart outlining a process (1400) according to an embodiment of the disclosure.

FIG. 14 shows a flow chart outlining a process (1400) according to an embodiment of the disclosure. The process (1400) can be used in the reconstruction of a block (e.g., a CB), so to generate a prediction block for the block under reconstruction. The term block may be interpreted as a prediction block, a CB, a luma CB, a CU, a PU, or the like. In various embodiments, the process (1400) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the video encoder (503), and the like. In some embodiments, the process (1400) is implemented in software instructions, thus when the processing circuitry executes the software instructions, the processing circuitry performs the process (1400). The process starts at (S1401) and proceeds to (S1410).

At (S1410), coding information of the block can be decoded from a coded video bitstream. The coding information can indicate that the block is coded with the subblock-based affine motion model. The subblock-based affine motion model can include affine parameters that are based on multiple CPMVs for the block. The block can include affine subblocks having corresponding subblock MVs.

The affine parameters can be similar or identical to the affine parameters described above (e.g., 'a', 'c', and 'd' in Eqs. (7)-(9). One or more of the affine parameters can indicate a ratio of a MV difference (or MVD) over the block size (e.g., a width of the block). Referring to FIG. 8A, the first affine parameter and the second affine parameter can indicate a ratio of a MVD between CPMV1 and CPMV0 over a width of the CB (810A). More specifically, the first affine parameter can indicate the ratio of the x component of the MVD between CPMV1 and CPMV0 over the width of the block (e.g., 810A). The second affine parameter can indicate the ratio of the y component of the MVD between CPMV1 and CPMV0 over the width of the block.

In general, one of (i) the ratio of the MVD over the block size, (ii) a MVD of two neighboring affine subblocks, and (iii) a MVD of two neighboring samples can be determined from another one of (i)-(iii). For example, the block includes 16×16 samples and is divided into 16 affine subblocks having an affine subblock size of 4×4 samples. The x component of the MVD (e.g., $mv_{1x}-mv_{0x}$) between CPMV1 and CPMV0 is 4 pixels, and thus the ratio of the MVD over the block size is equal to 4 pixels/16 samples=0.25 pixels/sample. Accordingly, the MVD of two neighboring samples is 0.25 pixels, and the MVD of two neighboring affine subblocks 1 pixel.

As described above, in addition to or instead of including 'a', 'c', and/or 'd', the affine parameters can include parameters to describe various motions of the block, such as zooming in/zooming out, rotation, and/or the like.

At (S1420), whether to select a subblock characteristic for generating a prediction for a sample in one of the affine subblocks based on the corresponding subblock MV can be determined based on the coding information.

In an example, the prediction for the sample refers to a prediction (e.g., the initial subblock prediction I(i,j)) with the subblock-based affine motion compensation, such as described in Step (1) with reference to FIG. 12.

The prediction for the sample can refer to a refined prediction. Any suitable prediction refinement method (e.g., a PROF) can be used to generate the refined prediction. Referring back to FIG. 12, in an example, the prediction refers to the refined prediction I'(i,j) that can be obtained based on the initial prediction I(i,j) and the prediction refinement ΔI(i,j).

The subblock characteristic can indicate a subblock size used for generating the prediction for the sample, an interpolation filter type for the affine subblock, or the like.

The subblock size can include or indicate a size (e.g., a width and/or a height) of the affine subblock, a size (e.g., a width and/or a height) of an affine PROF subblock used in a PROF for the block, a size (e.g., a width and/or a height) of a gradient subblock used in gradient calculations in the PROF. In an example, the affine subblock size, the affine PROF subblock size, and the gradient subblock size are identical. In an example, the gradient subblock size is larger than the affine subblock size and the affine PROF subblock size.

The subblock size can include any suitable size (e.g., any suitable width and/or any suitable height). In an example, the subblock size is conditionally selected or conditionally switchable between a first size (e.g., a first width and/or a first height) and a second size (e.g., a second width and/or a second height). The second size (e.g., 8 samples or 8×8 samples) is larger than the first size (e.g., 4 samples or 4×4 samples).

The interpolation filter type can be an interpolation filter having any suitable length (e.g., 6-tap, 8-tap). The interpolation filter type can be one of: (i) a first interpolation filter having a first length (e.g., 6-tap) for horizontal interpolation, (ii) a second interpolation filter having a second length (e.g., 8-tap) for the horizontal interpolation, (iii) a first interpolation filter having the first length for vertical interpolation, (iv) a second interpolation filter having the second length for the vertical interpolation, (v) a first interpolation filter having the first length for the interpolation, and (vi) a second interpolation filter having the second length for the interpolation. The second length is larger than the first length. The interpolation filter type can be conditionally selected or conditionally switchable in a plurality of (i)-(vi).

In response to selecting the subblock characteristic for generating the prediction for the sample, the process (1400) proceeds to (S1430). Otherwise, the process (1400) proceeds to (S1499) and terminates.

At (S1430), the subblock characteristic can be determined based on at least one of the affine parameters, as described above. The subblock characteristic can indicate one of: (i) the subblock size used for generating the prediction for the sample and (ii) the interpolation filter type for the affine subblock.

In an embodiment, the subblock characteristic can be determined based on the at least one of the affine parameters and one of: (i) a threshold and (ii) a pre-defined range (e.g., [M, N]), as described above. The subblock size can be the affine subblock size, and the interpolation filter type can include the first interpolation filter or the second interpolation filter.

In an embodiment, the block includes the gradient subblock used for the gradient calculations in the PROF and the subblock size is a size of the gradient subblock. The gradient calculations are (i) block-based gradient calculations with the subblock size being equal to the block size or (ii) subblock-based gradient calculations with the subblock size being less than the block size. In an example, the at least one of the affine parameters includes a plurality of the affine parameters. Whether the gradient calculations are block-based or subblock-based can be determined based on one of: (i) a maximum or a minimum of absolute values of the plurality of the affine parameters and a threshold and (ii) the absolute values and a pre-defined range.

In an embodiment, the at least one of the affine parameters includes a plurality of the affine parameters. The subblock characteristic can be determined based on one of (i) a threshold and a minimum value, a maximum value, a minimum absolute value, a maximum absolute value, or a mean value of the plurality of the affine parameters and (ii) a pre-defined range (e.g., [M, N]) and a value range.

(S1420) and/or (S1430) can be repeated. For example, (S1420) and (S1430) are implemented to determine the subblock characteristic to be the affine subblock size of 4×4 luma samples, for example, based on a first subset of the affine parameters. (S1420) and (S1430) can be repeated to determine the subblock characteristic to be the gradient subblock size where the gradient subblock size is a size of the block, for example, based on a second subset of the affine parameters. Accordingly, the affine subblock size is 4×4 luma samples and the gradient subblock size is the size of the block.

At (S1440), the sample in the affine subblock can be reconstructed based on the determined subblock characteristic. For example, the subblock-based affine motion model with the PROF is implemented with the affine subblock size being 4×4 luma samples and the gradient subblock size being the size of the block where the affine PROF subblock size is equal to the affine subblock size. Accordingly, the refined prediction I'(i,j) can be obtained based on the the affine subblock size and the gradient subblock size. In an example, a reconstructed sample value can be determined based on the refined prediction I'(i,j) and a residue of the sample (e.g., when the residue is non-zero).

For example, for the block-based gradient calculations, a neighboring sample of the block can be padded by one of: (i) interpolating using a corresponding subblock MV of a subblock that includes the neighboring sample, (ii) copying from a nearest integer sample position in a reference picture for the block, and (iii) copying from a prediction of a closest sample in the block where the neighboring sample of the block can be used for the block-based gradient calculations.

The process (1400) can be suitably adapted to various scenarios and steps in the process (1400) can be adjusted accordingly. One or more of the steps in the process (1400) can be adapted, omitted, repeated, and/or combined. Any suitable order can be used to implement the process (1400). Additional step(s) can be added.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 15 shows a computer system (1500) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 15:
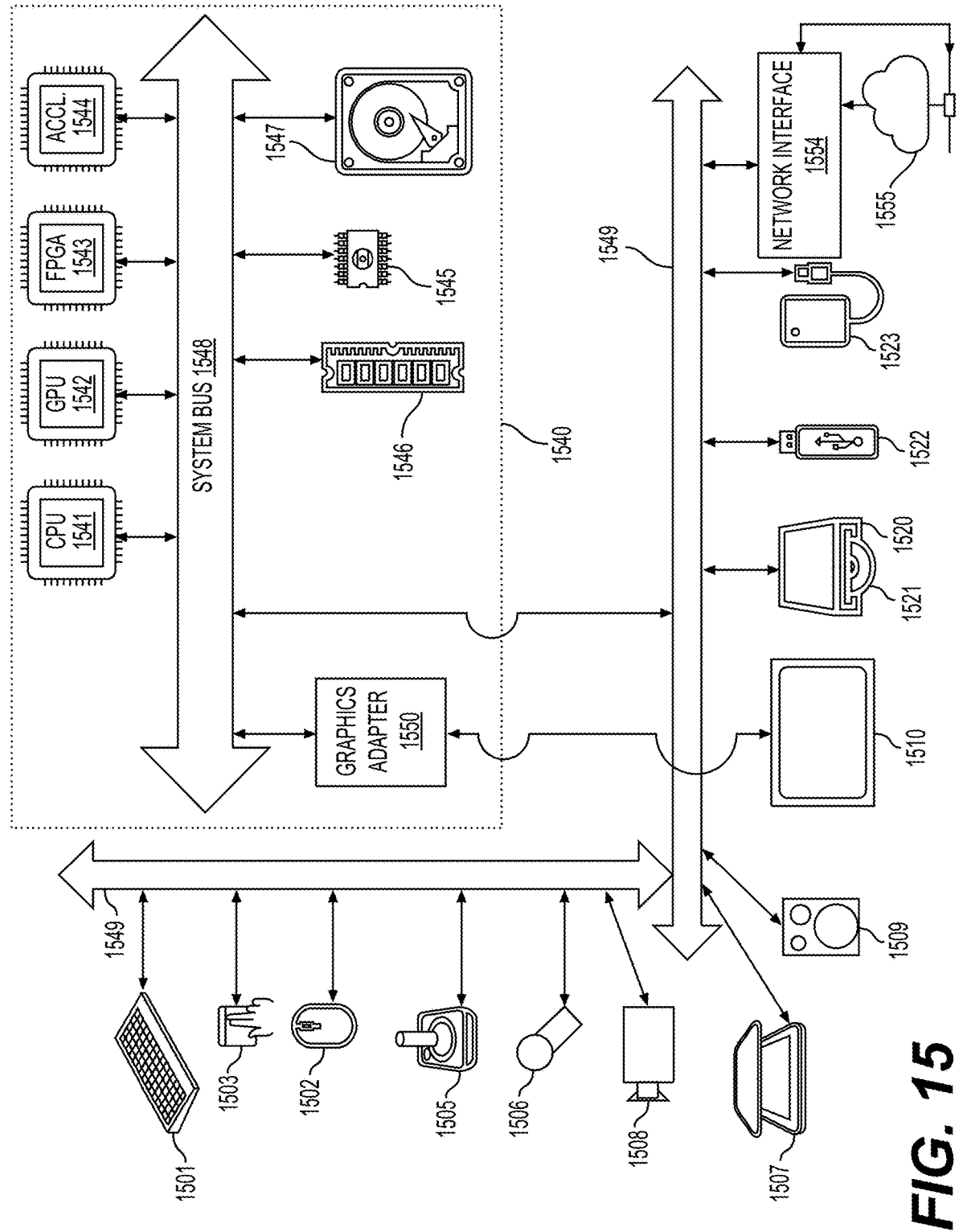
FIG. 15 is a schematic illustration of a computer system in accordance with an embodiment.

The components shown in FIG. 15 for computer system (1500) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1500).

Computer system (1500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1501), mouse (1502), trackpad (1503), touch screen (1510), data-glove (not shown), joystick (1505), microphone (1506), scanner (1507), camera (1508).

Computer system (1500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1510), data-glove (not shown), or joystick (1505), but there can also be tactile feedback devices that do not serve as input devices), audio output devices (such as: speakers (1509), headphones (not depicted)), visual output devices (such as screens (1510) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1500) can also include human accessible storage devices and their associated media such as optical media including CD/DVD ROM/RW (1520) with CD/DVD or the like media (1521), thumb-drive (1522), removable hard drive or solid state drive (1523), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1500) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1549) (such as, for example USB ports of the computer system (1500)); others are commonly integrated into the core of the computer system (1500) by attachment to a system bus as described below (for example Ethernet interface into a PC computer system or cellular network interface into a smartphone computer system). Using any of these networks, computer system (1500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1540) of the computer system (1500).

The core (1540) can include one or more Central Processing Units (CPU) (1541), Graphics Processing Units (GPU) (1542), specialized programmable processing units in the form of Field Programmable Gate Areas (FPGA) (1543), hardware accelerators for certain tasks (1544), and so forth. These devices, along with Read-only memory (ROM) (1545), Random-access memory (1546), internal mass storage such as internal non-user accessible hard drives, SSDs, and the like (1547), may be connected through a system bus (1548). In some computer systems, the system bus (1548) can be accessible in the form of one or more physical plugs to enable extensions by additional CPUs, GPU, and the like. The peripheral devices can be attached either directly to the core's system bus (1548), or through a peripheral bus (1549). Architectures for a peripheral bus include PCI, USB, and the like.

CPUs (1541), GPUs (1542), FPGAs (1543), and accelerators (1544) can execute certain instructions that, in combination, can make up the aforementioned computer code. That computer code can be stored in ROM (1545) or RAM (1546). Transitional data can be also be stored in RAM (1546), whereas permanent data can be stored for example, in the internal mass storage (1547). Fast storage and retrieve to any of the memory devices can be enabled through the use of cache memory, that can be closely associated with one or more CPU (1541), GPU (1542), mass storage (1547), ROM (1545), RAM (1546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1500), and specifically the core (1540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1540) that are of non-transitory nature, such as core-internal mass storage (1547) or ROM (1545). The software implementing various embodiments of the present disclosure can be stored in such devices and executed by core (1540). A computer-readable medium can include one or more memory devices or chips, according to particular needs. The software can cause the core (1540) and specifically the processors therein (including CPU, GPU, FPGA, and the like) to execute particular processes or particular parts of particular processes described herein, including defining data structures stored in RAM (1546) and modifying such data structures according to the processes defined by the software. In addition or as an alternative, the computer system can provide functionality as a result of logic hardwired or otherwise embodied in a circuit (for example: accelerator (1544)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
AMVP: Advanced MVP
HMVP: History-based MVP
MMVD: Merge with MVD
MVD: Motion vector difference
MVP: Motion vector predictor
SbTMVP: Subblock-based TMVP
TMVP: Temporal MVP
VTM: Versatile test model While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
   decoding coding information of a current block (CB) from a coded video bitstream, the coding information indicating that the CB is coded with a subblock-based affine motion model, the subblock-based affine motion model including affine parameters that are based on multiple control point (CP) motion vectors (MVs) (CPMVs) for the CB and based on at least one of a height or a width of the CB, the CB including an affine subblock having a subblock MV;
   determining, based on the coding information, whether to select a subblock characteristic for generating a prediction for a sample in the affine subblock based on the subblock MV;
   in response to selecting the subblock characteristic, determining the subblock characteristic based on at least one of the affine parameters, the subblock characteristic indicating one of: (i) a subblock size used for generating the prediction for the sample and (ii) an interpolation filter type for the affine subblock; and
   reconstructing the sample in the affine subblock based on the determined subblock characteristic, wherein
   the determining the subblock characteristic is performed based on comparing an absolute value of the at least one of the affine parameters to one of: (i) a threshold and (ii) a pre-defined range, and the interpolation filter type includes a first interpolation filter having a first length or a second interpolation filter having a second length, the first length being less than the second length.

2. The method of claim 1, wherein
when the subblock-based affine motion model is based on a 4-parameter affine motion model,
the CB includes a top left CP having a first CPMV and a top right CP having a second CPMV; and
the affine parameters include a first affine parameter and a second affine parameter, the first affine parameter indicating a ratio of an x component of a first MV difference between the second CPMV and the first CPMV over the width of the CB, the second affine parameter indicating a ratio of a y component of the first MV difference over the width of the CB; and
when the subblock-based affine motion model is based on a 6-parameter affine motion model,
the CB includes the top left CP having the first CPMV, the top right CP having the second CPMV, and a bottom left CP having a third CPMV; and
the affine parameters include the first affine parameter, the second affine parameter, a third affine parameter, and a fourth affine parameter, the third affine parameter indicating a ratio of an x component of a second MV difference between the third CPMV and the first CPMV over the height of the CB, the fourth affine parameter indicating a ratio of a y component of the second MV difference over the height of the CB.

3. The method of claim 2, wherein
the subblock size is an affine subblock size of the affine subblock.

4. The method of claim 3, wherein:
the at feast one of the affine parameters includes a plurality of the affine parameters; and
the determining the subblock characteristic includes:
determining whether absolute values of the plurality of the affine parameters satisfy a pre-defined condition that is one of: (i) a maximum of the absolute values is larger than the threshold, (ii) the maximum of the absolute values is larger than or equal to the threshold, (iii) a minimum of the absolute values is larger than the threshold, (iv) the minimum of the absolute values is larger than or equal to the threshold, and (v) the absolute values are outside the pre-defined range;
in response to the absolute values satisfying the pre-defined condition, determining the subblock characteristic to indicate one of: the affine subblock size being a first size and the interpolation filter type being the first interpolation filter; and
in response to the absolute values not satisfying the pre-defined condition, determining the subblock characteristic to indicate one of: the affine subblock size being a second size and the interpolation filter type being the second interpolation filter, the second size being larger than the first size.

5. The method of claim 2, wherein
the CB includes a gradient subblock used for gradient calculations in a prediction refinement with optical flow (PROF) for the CB;
the subblock size is a size of the gradient subblock; and
the gradient calculations are (i) block-based gradient calculations with the subblock size being equal to a block size of the CB or (ii) subblock-based gradient calculations with the subblock size being less than the block size.

6. The method of claim 5, wherein
the at least one of the affine parameters includes a plurality of the affine parameters; and
the method further includes determining, based on one of: (i) a maximum or a minimum of absolute values of the plurality of the affine parameters and the threshold and (ii) the absolute values and the pre-defined range, whether the gradient calculations are block-based or subblock-based.

7. The method of claim 5, further comprising:
padding; for the block-based gradient calculations, a neighboring sample of the CB by one of: (i) interpolating using a corresponding subblock MV of a subblock that includes the neighboring sample, copying from a nearest integer sample position in a reference picture for the CB, and (iii) copying from a prediction of a closest sample in the GB, the neighboring sample of the CB being used for the block-based gradient calculations.

8. The method of claim 2, wherein
the subblock size is one of: a width of the affine subblock, a height of the affine subblock, a width of an affine PROF subblock used in a PROF for the CB; a height of the affine PROF subblock, a width of a gradient subblock used in gradient calculations in the PROF, and a height of the gradient subblock; and
the interpolation filter type is one of: (i) the first interpolation filter having the first length for horizontal interpolation, (ii) the second interpolation filter having the second length for the horizontal interpolation, (iii) the first interpolation filter having the first length for vertical interpolation, and (iv) the second interpolation filter having the second length for the vertical interpolation, the second length being larger than the first length.

9. The method of claim 1, further comprising:
determining another subblock characteristic based on at least another one of the affine parameters, the at least another one of the affine parameters being different from or identical to the at least one of the affine parameters, and the another subblock characteristic, being different from the subblock characteristic.

10. The method of claim 1, wherein
the at least one of the affine parameters includes a plurality of the affine parameters; and
the determining the subblock characteristic includes determining the subblock characteristic based on one of (i) the threshold and a minimum value, a maximum value, a minimum absolute value, a maximum absolute value, or a mean value of the plurality of the affine para cars and (ii) the pre-defined range and a value range of the plurality of the affine parameters.

11. The method of claim 8, wherein
the at least one of the affine parameters includes a plurality of the affine parameters;
the subblock characteristic is determined based on a maximum absolute value of the plurality of the affine parameters and the threshold;
in response to the maximum absolute value being one of larger than the threshold and larger than or equal to the threshold, determining the subblock characteristic to indicate one of: (i) the subblock size being a first size, (ii) the interpolation filter type being the first interpolation filter for the horizontal interpolation, and (iii) the interpolation filter type being the first interpolation filter for the vertical interpolation; and in response to the maximum absolute value not being the one of larger than the threshold and larger than or equal to the threshold, determining the subblock characteristic to indicate one of: (i) the subblock size being a second size, (ii) the interpolation filter type being the second interpolation filter for the horizontal interpolation, and (iii) the interpolation filter type being the second interpolation filter for the vertical interpolation, the second size being larger than the first size.

12. An apparatus for video decoding, comprising:
processing circuitry configured to:
 decode coding information of a current block (CB) from a coded video bitstream, the coding information indicating that, the CB is coded with a subblock-based affine motion model, the subblock-based affine motion model including affine parameters that are based on multiple control point (CP) motion vectors (MVs) (CPMVs) for the CB and based on at least one of a height or a width of the CB, the CB including an affine subblock having a subblock MV;
 determine, based on the coding information, whether to select a subblock characteristic for generating a prediction for a sample in the affine subblock based on the subblock MV;
 in response to selecting the subblock characteristic, determine the subblock characteristic based on at least one of the affine parameters, the subblock characteristic indicating one of: (i) a subblock size used for generating the prediction for the sample and (ii) an interpolation filter type for the affine subblock; and
 reconstruct the sample in the affine subblock based on the determined subblock characteristic, wherein
the subblock characteristic is determined based on a comparison of an absolute value of the at least one of the affine parameters to one of: (i) a threshold and (ii) a pre-defined range, and
the interpolation filter type includes a first interpolation filter having a first length or a second interpolation filter having a second length, the first length being less than the second length.

13. The apparatus of claim 12, wherein
when the subblock-based affine motion model is based on a 4-parameter affine motion model,
 the CB includes a top left CP having a first CPMV and a top right CP having a second CPMV; and
 the affine parameters include a first affine parameter and a second affine parameter, the first affine parameter indicating a ratio of an x component of a first MV difference between the second CPMV and the first CPMV over the width of the CB, the second affine parameter indicating a ratio of a y component of the first MV difference over the width of the CB; and
when the subblock-based affine motion model is based on a 6-parameter affine motion model,
 the CB includes the top left CP having the first CPMV, the top right CP having the second CPMV; and a bottom left CP having a third CPMV; and
 the affine parameters include the first affine parameter, the second affine parameter, a third affine parameter, and a fourth affine parameter, the third affine parameter indicating a ratio of an x component of a second MV difference between the third CPMV and the first CPMV over the height of the CB, the fourth affine parameter indicating a ratio of a y component of the second MV difference over the height of the CB.

14. The apparatus of claim 13, wherein
the subblock size is an affine subblock size of the affine subblock.

15. The apparatus of claim 14, wherein:
the at least one of the affine parameters includes a plurality of the affine parameters; and
the processing circuitry is configured to:
 determine whether absolute values of the plurality of the affine parameters satisfy a pre-defined condition that is one of: (i) a maximum of the absolute values is larger than the threshold, (ii) the maximum of the absolute values is larger than or equal to the threshold, (iii) a minimum of the absolute values is larger than the threshold, (iv) the minimum of the absolute values is larger than or equal to the threshold, and (v) the absolute values are outside the pre-defined range;
 in response to the absolute values satisfying the pre-defined condition, determine the subblock characteristic to indicate one of: the affine subblock size being a first size and the interpolation filter type being the first interpolation filter; and
 in response to the absolute values not satisfying the pre-defined condition, determine the subblock characteristic to indicate one of: the affine subblock size being a second size and the interpolation filter type being the second interpolation filter, the second size being larger than the first size.

16. The apparatus of claim 13, wherein
the CB includes a gradient subblock used for gradient calculations in a prediction refinement with optical flow (PROF) for the CB;
the subblock size is a size of the gradient subblock; and
the gradient calculations are (i) block-based gradient calculations with the subblock size being equal to a block size of the GB or (ii) subblock-based gradient calculations with the subblock size being less than the block size.

17. The apparatus of claim 16, the processing circuitry is further configured to:
pad, for the block-based gradient calculations, a neighboring sample of the CB by one of: (i) interpolating using a corresponding subblock MV of a subblock that includes the neighboring sample, (ii) copying from a nearest integer sample position in a reference picture for the CB, and (iii) copying from a prediction of a closest sample in the CB, the neighboring sample of the CB being used for the block-based gradient calculations.

18. The apparatus of claim 13, wherein
the subblock size is one of: a width of the affine subblock, a height of the affine subblock, a width of an affine PROF subblock used in a PROF for the CB, a height of the affine PROF subblock, a width of a gradient subblock used in gradient calculations in the PROF, and a height of the gradient subblock; and
the interpolation filter type is one of: (i) the first interpolation filter having the first length for horizontal interpolation, (ii) the second interpolation filter having the second length for the horizontal interpolation, (iii) the first interpolation filter having the first length for vertical interpolation, and (iv) the second interpolation filter having the second length for the vertical interpolation, the second length being larger than the first length.

19. The apparatus of claim 12, wherein
the at least one of the affine parameters includes a plurality of the affine parameters; and
the processing circuitry is configured to determine the subblock characteristic based on one of (i) the threshold and a minimum value, a maximum value, a minimum absolute value, a maximum absolute value, or a mean value of the plurality of the affine parameters and (ii) the pre-defined range and a value range.

20. The apparatus of claim 18, wherein
the at least one of the affine parameters includes a plurality of the affine parameters;
the subblock characteristic is determined based on a maximum absolute value of the plurality of the affine parameters and the threshold; and
the processing circuitry is configured to:
 in response to the maximum absolute value being one of larger than the threshold and larger than or equal to the threshold, determine the subblock characteristic to indicate one of: (i) the subblock size being a first size, (ii) the interpolation filter type being the first interpolation filter for the horizontal interpolation, and (iii) the interpolation filter type being the first interpolation filter for the vertical interpolation; and
 in response to the maximum absolute value not being the one of larger than the threshold and larger than or equal to the threshold, determine the subblock characteristic to indicate one of: (i) the subblock size being a second size, (ii) the interpolation filter type being the second interpolation filter for the horizontal interpolation, and (iii) the interpolation filter type being the second interpolation filter for the vertical interpolation, the second size being larger than the first size.

* * * * *